(12) United States Patent
Öttl

(10) Patent No.: US 11,914,136 B2
(45) Date of Patent: Feb. 27, 2024

(54) BINOCULAR HAVING A PIVOTABLE HINGED BRIDGE

(71) Applicant: Swarovski-Optik AG & Co KG., Absam (AT)

(72) Inventor: Peter Öttl, Mils (AT)

(73) Assignee: Swarovski-Optik AG & Co KG (AT)

( * ) Notice: Subject to any disclaimer, the term of this patent is extended or adjusted under 35 U.S.C. 154(b) by 218 days.

(21) Appl. No.: 17/093,881

(22) Filed: Nov. 10, 2020

(65) Prior Publication Data

US 2021/0149181 A1 May 20, 2021

(30) Foreign Application Priority Data

Nov. 15, 2019 (AT) .............................. A50994/2019

(51) Int. Cl.
| | |
|---|---|
| *G02B 23/18* | (2006.01) |
| *G02B 7/06* | (2021.01) |
| *G02B 7/12* | (2021.01) |
| *G02B 7/24* | (2021.01) |

(52) U.S. Cl.
CPC .............. *G02B 23/18* (2013.01); *G02B 7/06* (2013.01); *G02B 7/12* (2013.01); *G02B 7/24* (2013.01)

(58) Field of Classification Search
CPC . G02B 23/18; G02B 7/06; G02B 7/12; G02B 7/24
USPC .......................................................... 359/407
See application file for complete search history.

(56) References Cited

U.S. PATENT DOCUMENTS

| | | | | |
|---|---|---|---|---|
| 1,364,381 | A * | 1/1921 | Kent ...................... | G02B 23/18 |
| | | | | 359/835 |
| 3,528,724 | A | 9/1970 | Bertin | |
| 4,601,552 | A * | 7/1986 | Jessmore ............... | G02B 23/18 |
| | | | | 359/490.02 |
| 2005/0237609 | A1 | 10/2005 | Nemoto et al. | |
| 2007/0183059 | A1* | 8/2007 | Miyaji ..................... | G02B 7/06 |
| | | | | 359/699 |
| 2009/0174939 | A1* | 7/2009 | Heintz ..................... | G02B 5/04 |
| | | | | 359/480 |
| 2010/0188744 | A1* | 7/2010 | Hengst ................... | G02B 23/18 |
| | | | | 359/413 |

(Continued)

FOREIGN PATENT DOCUMENTS

| | | |
|---|---|---|
| DE | 1241144 B | 5/1967 |
| DE | 1547239 A1 | 11/1969 |

(Continued)

OTHER PUBLICATIONS

Search Report for European Application No. 20207274 dated Jul. 9, 2021. 5 pgs. [See p. 1-2, categorizing the cited references].

*Primary Examiner* — William R Alexander
*Assistant Examiner* — Sharrief I Broome
(74) *Attorney, Agent, or Firm* — Lerner David LLP

(57) ABSTRACT

The technology generally relates to a binocular having two tubes, which are connected to one another by means of a hinged bridge pivotable about a hinge axis for adjusting the interpupillary distance. Within each of the two tubes a beam path is formed with a first optical axis of an objective lens, with a second optical axis of an eyepiece and with a prism erecting system, characterized in that the first optical axis of the objective lens and the second optical axis of the eyepiece are offset parallel to each other by a distance.

16 Claims, 11 Drawing Sheets

(56) References Cited

U.S. PATENT DOCUMENTS

| | | | |
|---|---|---|---|
| 2011/0051117 A1* | 3/2011 | Pernstich | F41G 3/06 356/4.01 |
| 2013/0258161 A1 | 10/2013 | Sinn | |
| 2014/0160561 A1* | 6/2014 | Schlierbach | G02B 23/00 359/425 |
| 2015/0002938 A1* | 1/2015 | Bach | G02B 27/64 359/554 |
| 2015/0049382 A1* | 2/2015 | Luthardt | G02B 7/12 359/408 |
| 2015/0054936 A1* | 2/2015 | Bach | G02B 23/18 359/407 |
| 2019/0170997 A1* | 6/2019 | Fukumoto | G02B 23/18 |

FOREIGN PATENT DOCUMENTS

| | | |
|---|---|---|
| DE | 2365071 A1 | 7/1975 |
| DE | 9201269 U1 | 4/1992 |
| DE | 102005018592 A1 | 11/2005 |
| DE | 102010025136 A1 | 12/2011 |
| DE | 102011110991 A1 | 2/2013 |
| EP | 1818705 A1 | 8/2007 |
| EP | 2605055 A1 | 6/2013 |
| EP | 3495866 A1 | 6/2019 |
| GB | 1427004 A | 3/1976 |

\* cited by examiner

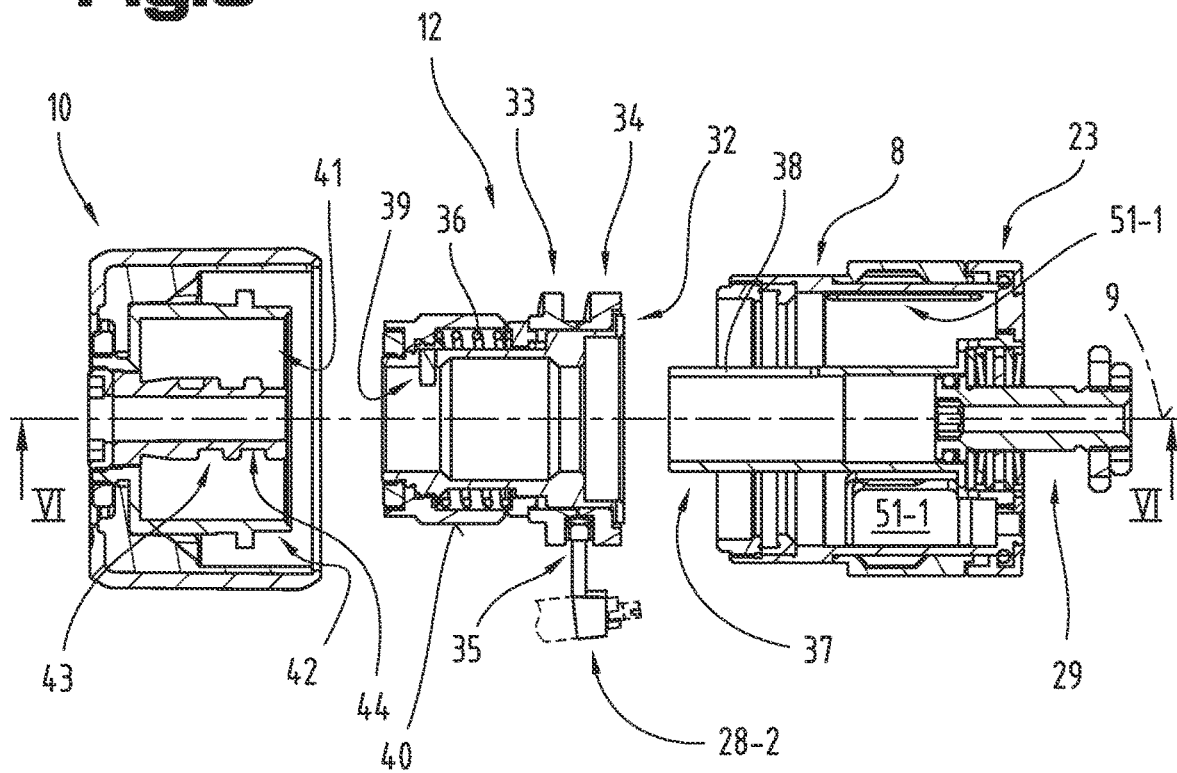
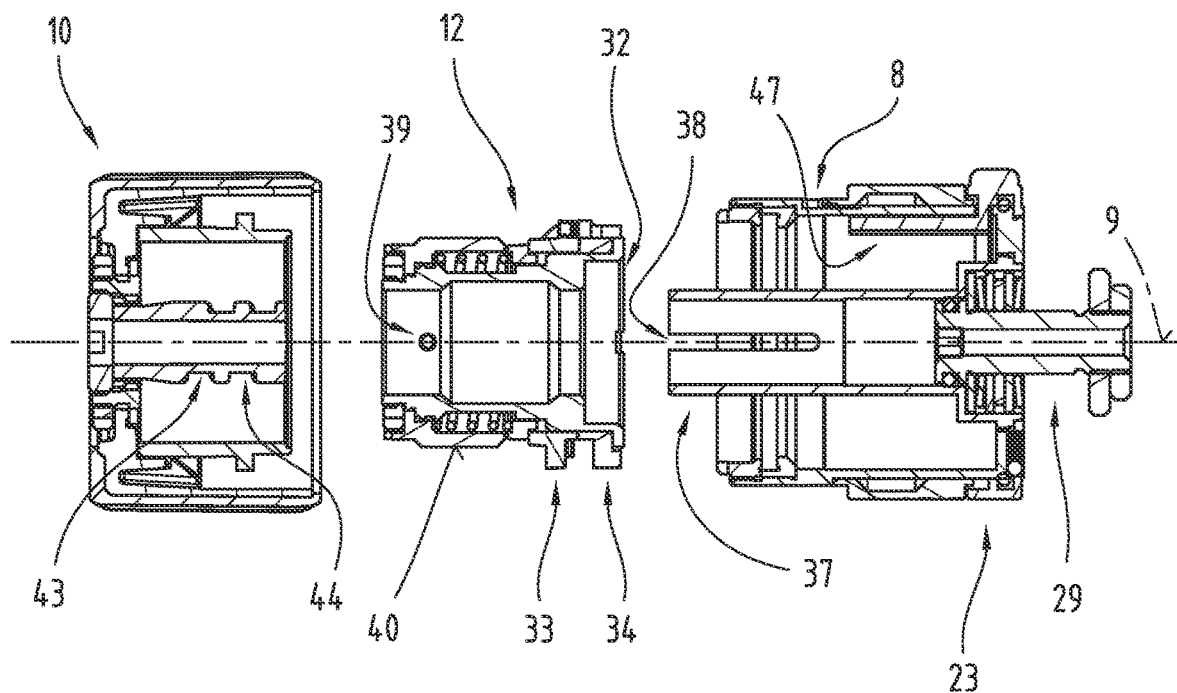

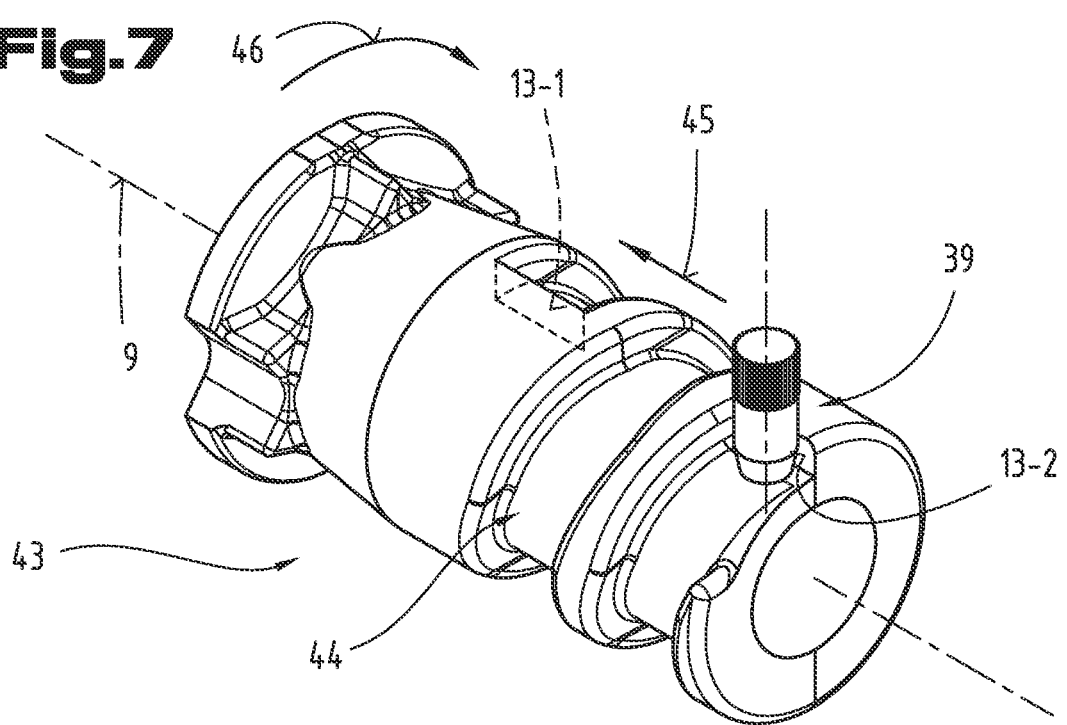
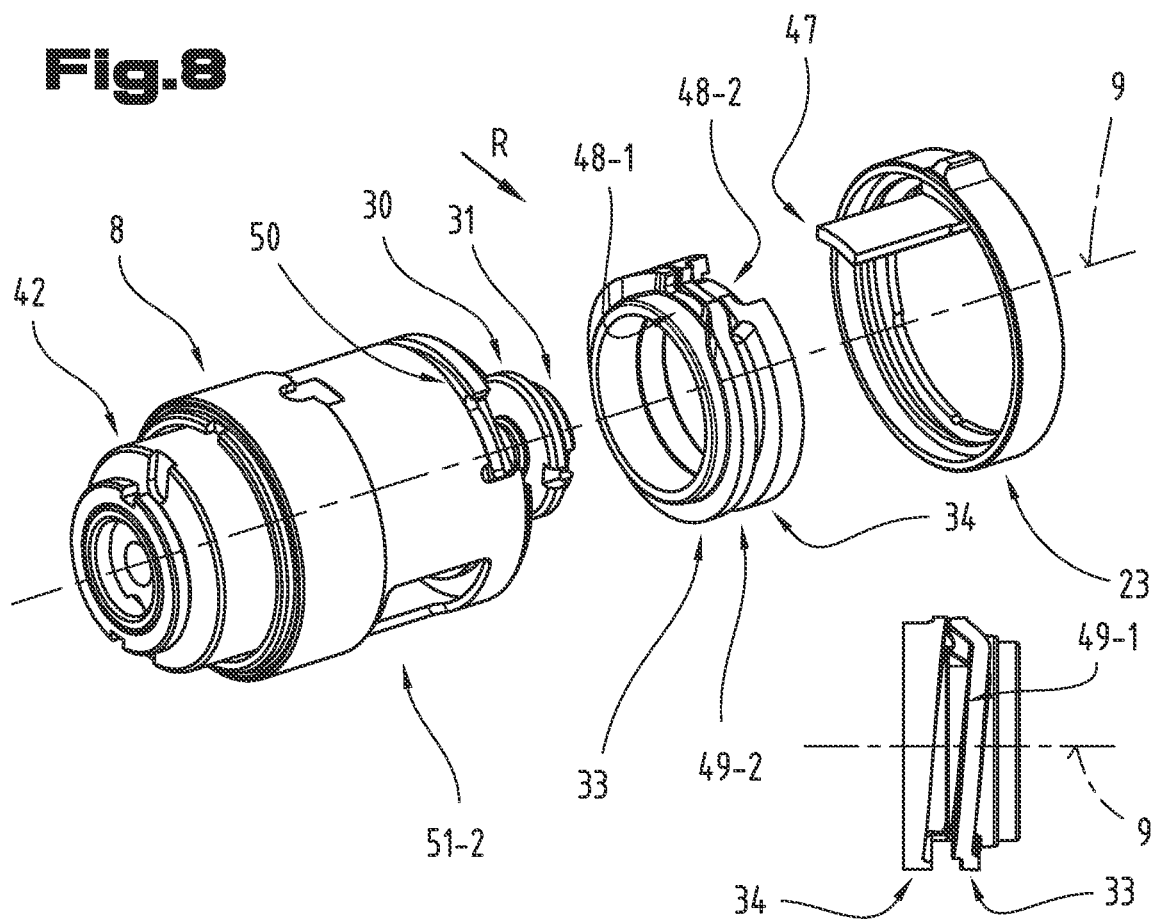

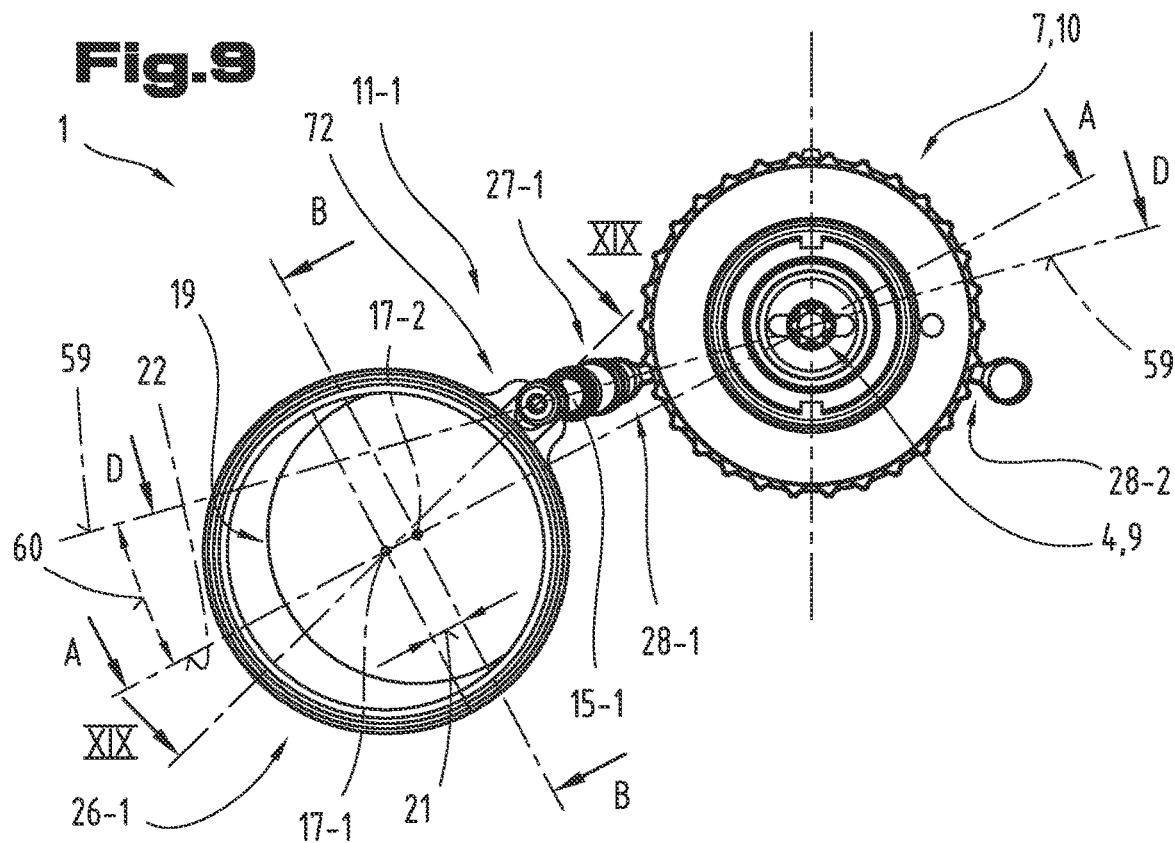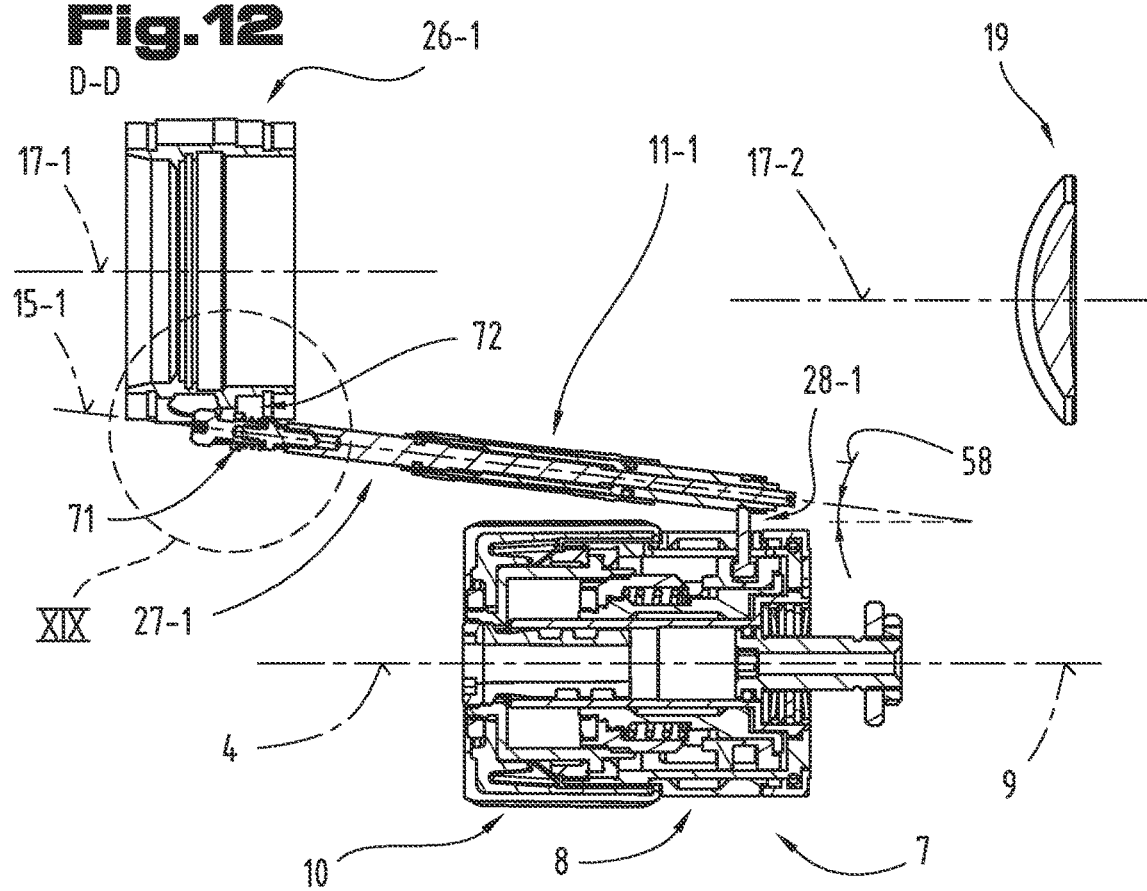

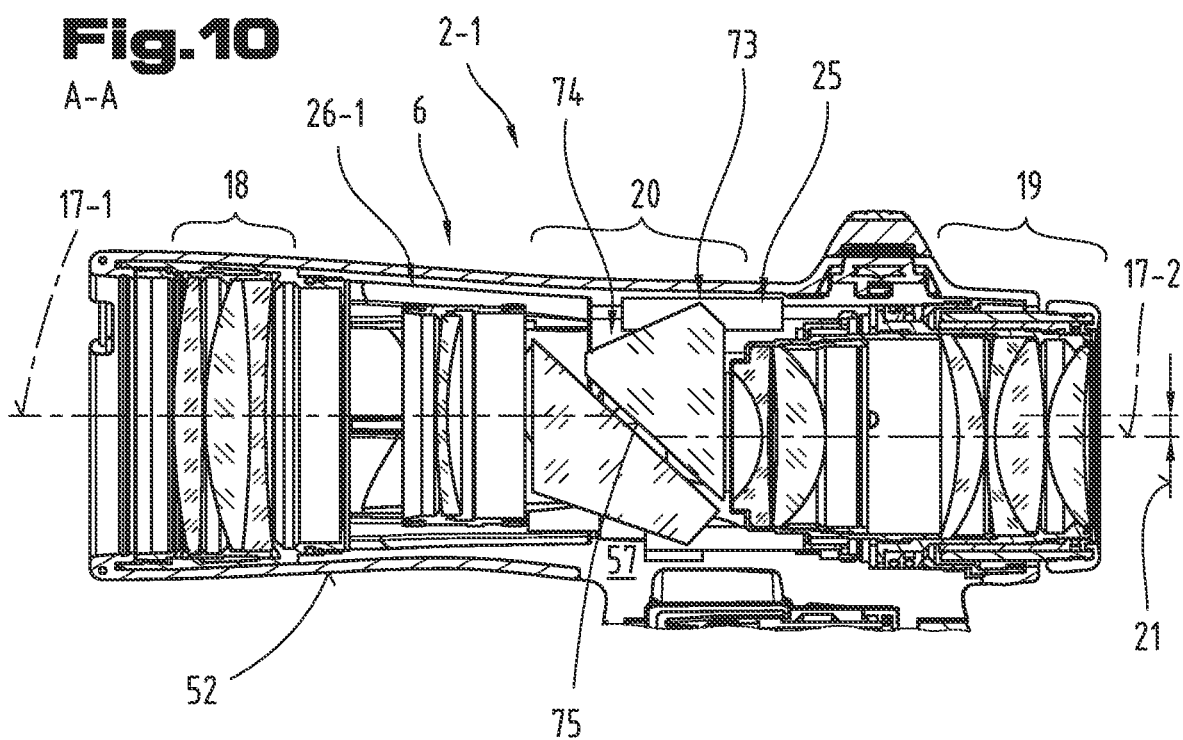
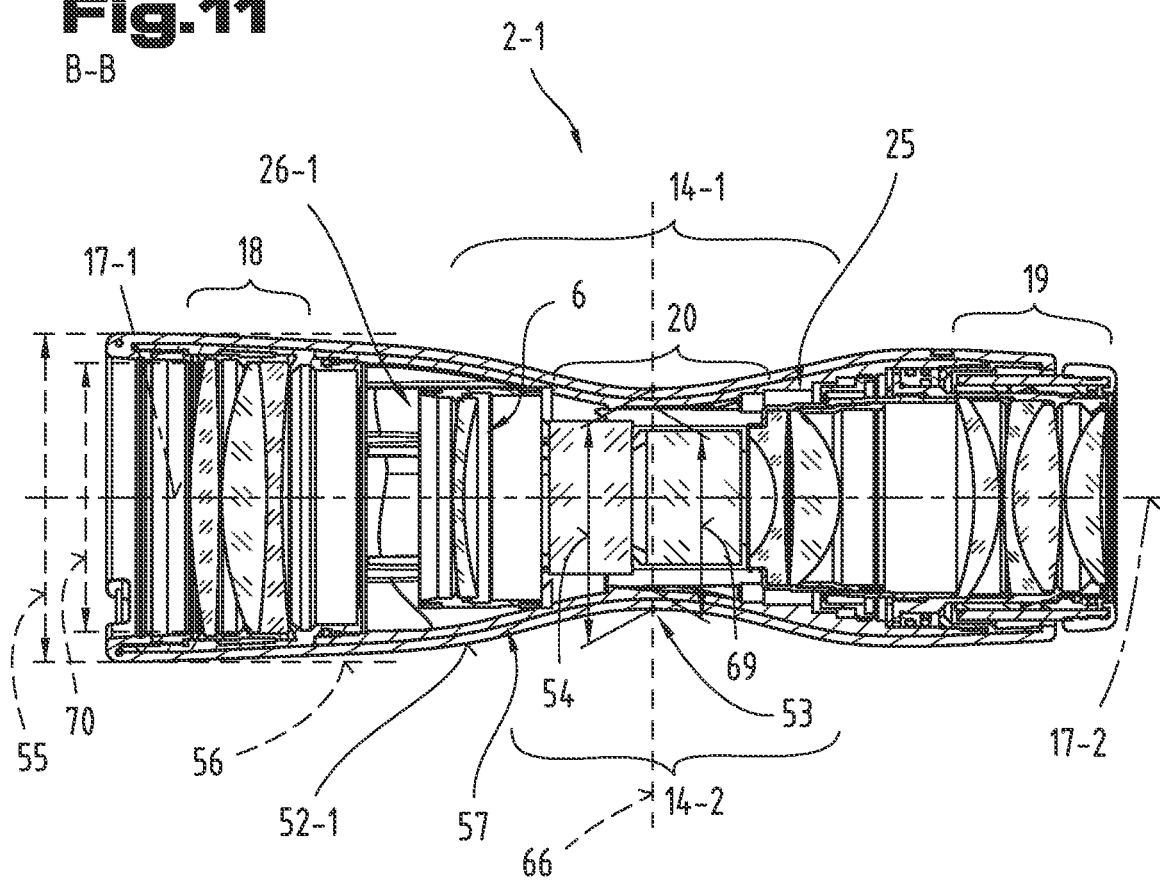

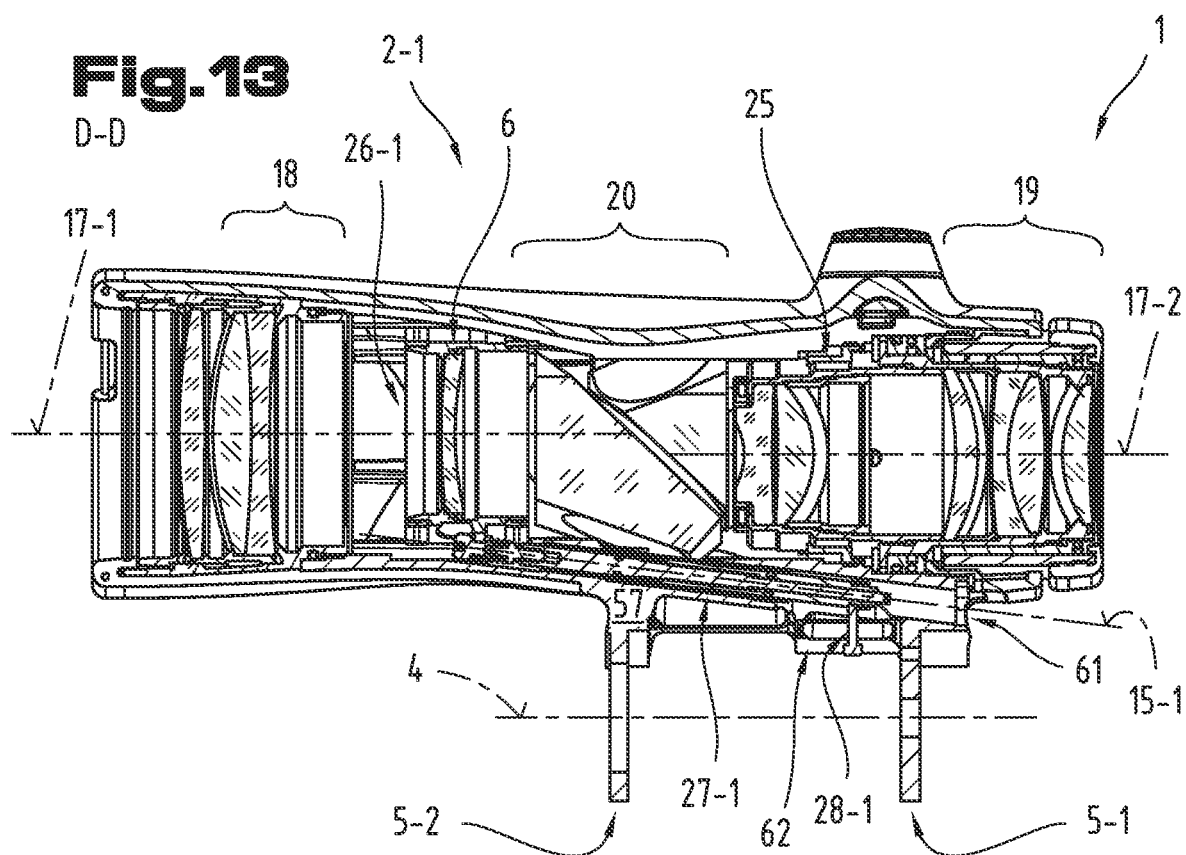
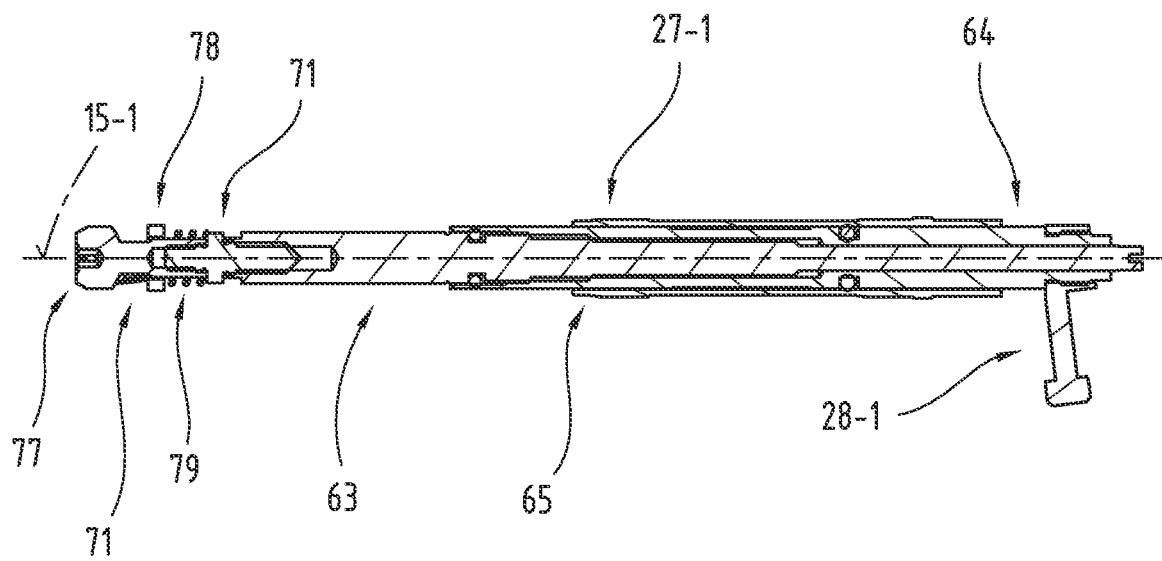

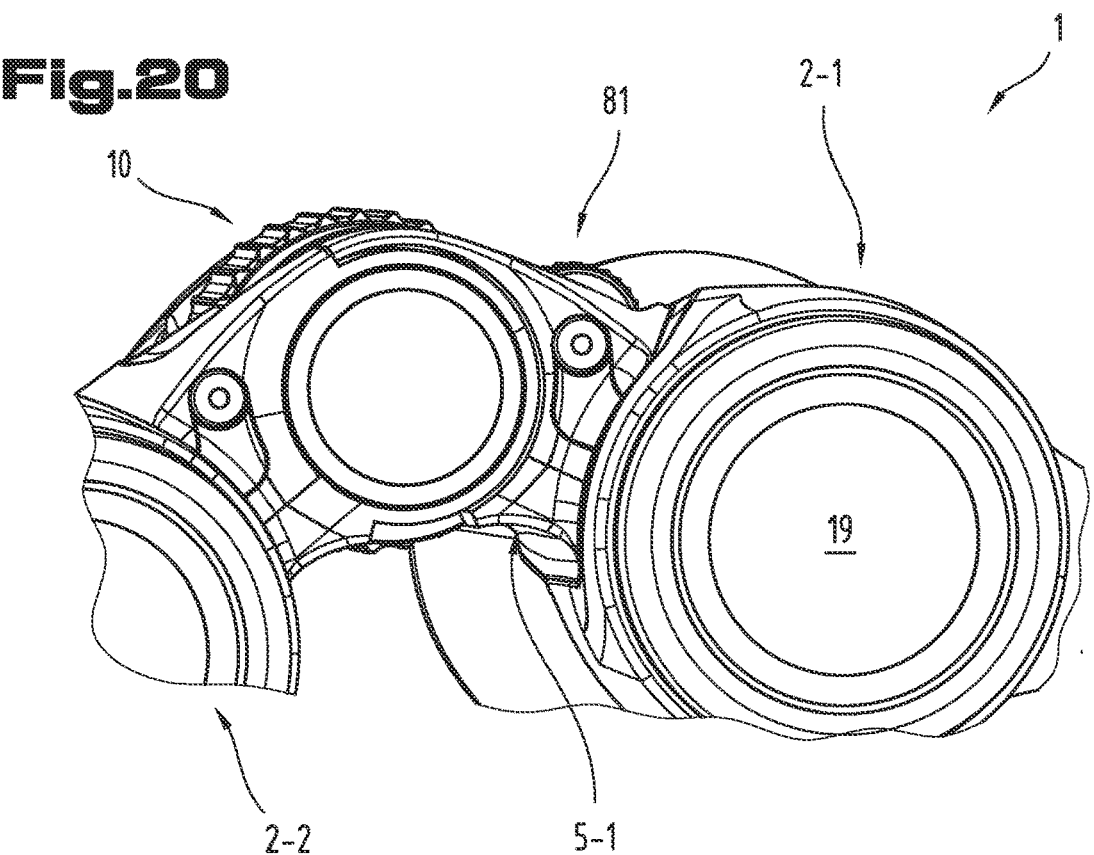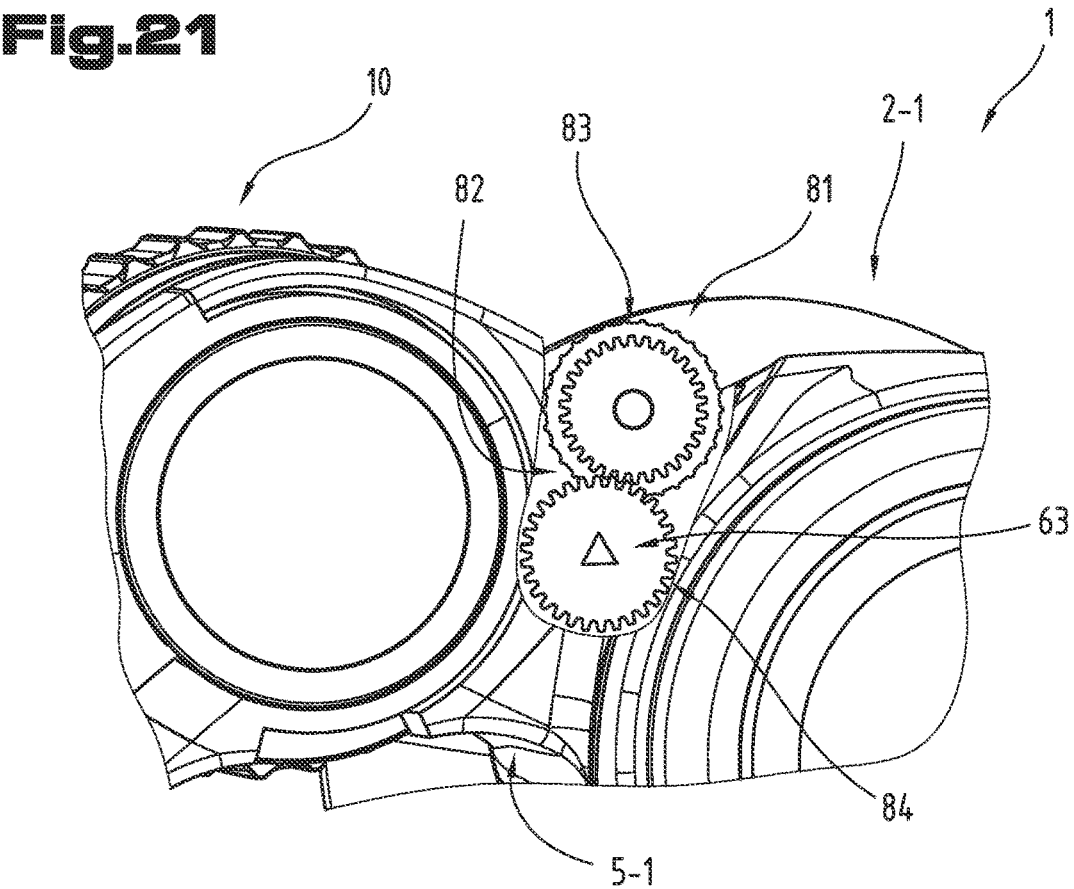

BINOCULAR HAVING A PIVOTABLE HINGED BRIDGE

CROSS REFERENCE TO RELATED APPLICATION

The present application claims priority from Austrian Patent Application No. A50994/2019 filed Nov. 15, 2019, the disclosure of which is hereby incorporated herein by reference.

BACKGROUND

The technology relates to a binocular having two tubes, which are connected to one another by means of a hinged bridge pivotable about a hinge axis for adjusting the interpupillary distance, wherein in the two tubes, in each case, a beam path is formed with a first optical axis of an objective lens, with a second optical axis of an eyepiece and with a prism erecting system, wherein the first optical axis of the objective lens and the second optical axis of the eyepiece are offset parallel to each other by a distance so that these axes do not coincide.

BRIEF SUMMARY

Common binoculars of the aforementioned type have the disadvantage that they are often unwieldy to operate, since, due to the way of their construction, they usually have a relatively large diameter in an area where a user holds the binocular during use.

It is therefore an object of the technology to take structural measures which allow greater freedom in designing the outer shape of the binocular.

This object is achieved by means of a binocular of the initially mentioned type according to the technology in that the first optical axis of the objective lens and the second optical axis of the eyepiece are in a common plane with the hinge axis of the hinged bridge.

The solution according to the technology allows for the realization of a low constructional height in the middle region in which the prism is arranged due to the arrangement of the axes differing from the arrangement in common binoculars. Thus, the solution according to the technology allows for the gained installation space to be used to improve ergonomics.

Advantageous further developments of the technology are indicated in the sub-claims.

To improve ergonomics, it can be provided that an outer side of each tube comprises a waist formed with a circumferential shape deviating from a circular shape in a region of the prism erecting system, wherein a section extending on an upper side of the tube is formed as a first retaining recess following the waist for a section of a finger and a section extending on a bottom side of the tube is formed as a second retaining recess following the waist for a section of a thumb of a user.

Moreover, it is advantageous that outer sides of the two tubes each comprise the waist in a section of their longitudinal extent parallel to the optical axis, in a region of the prism erecting system in a direction perpendicular with respect to the first plane.

Moreover, it can be provided that a cross-section normal to the first plane and to the direction of the optical axis through each of the tubes in the region of the waist has its narrowest part in an intersection area of the respective tube with a plane extending normal to the direction of the first optical axis of the objective lens, wherein a ratio of a diameter of the narrowest part of the tube normal to the first plane to a diameter of the housing in the area of the objective lens has a value of below 80%, in particular of between 60% and 80%, and/or the ratio has a value which is lower than 0.80, in particular has a value amounting to between 0.60 and 0.80.

In an advantageous further development, it can be provided that an axially displaceable focusing means is arranged in each one of the two tubes, and wherein a common focusing device for displacing the focusing means is formed, wherein the focusing device comprises a housing and a focusing knob rotatable about a rotational axis and the rotational axis is arranged coaxially to the hinge axis, and wherein the focusing knob is rotationally coupled to a focusing gear and each focusing gear comprises a push rod, by means of which each focusing gear is coupled to one of the two focusing means, wherein a direction of a longitudinal axis of the push rod encloses an acute angle with a direction of the hinge axis.

According to a preferred embodiment, the hinge axis can span a second plane with the longitudinal axis of the push rod, wherein the first plane and the second plane commonly enclose an acute angle with a value between 0° and 30°, in particular between 10° and 30°.

It is particularly preferred for the direction of the longitudinal axis of the push rod of each tube to be aligned obliquely, in particular skew, with respect to a direction of an optical axis of the tube.

Advantageously, each tube in the region of its waist can have two retaining recesses opposite to one another, in particular two retaining recesses arranged on sections of the tube rotated by 180° with respect to one another.

The handling can be further improved by the retaining recesses each having a concave cross-section transversely to the longitudinal direction of the waist.

It has proven particularly advantageous that a direction of a longitudinal extent of each retaining recess extends obliquely to a direction of a longitudinal extent of the tube.

To achieve a very high operating comfort, it can be provided that each retaining recess of each tube has a first eyepiece-side end region located closer to the eyepiece and a second objective-side end region located closer to the objective lens, wherein the distance between the respective eyepiece-side end regions of the retaining recesses of the two tubes is smaller than the distance between the respective objective-side end regions of the retaining recesses of the two tubes.

The operating comfort can be further increased by the retaining recesses of the two tubes tapering towards one another in a V-shape, wherein a retaining recess of a first one of the two tubes forms a first limb of the "V" and a retaining recess of a second one of the two tubes forms a second limb of the "V".

According to an embodiment which is very advantageous in view of ergonomics, it can be provided that a cross-section normal to the first plane and to the direction of the optical axis through each one of the tubes in the region of their waists has its widest part in an intersection area of the tube with the first plane.

In a variant which is particularly advantageous in view of the required installation space it is provided that a tip of a roof edge of the prism erecting system is arranged in the region of the widest part and facing outwards, wherein the shortest distance between the tip of the roof edge and the inner wall of the tube is smaller than the shortest distance between the tip of the roof edge and a surface of the prism erecting system opposite the tip of the roof edge.

According to a preferred embodiment of the technology, a second plane extending through the first retaining recess at the upper side of the tube and through the second retaining recess at the bottom side of the tube extends through the prism erecting system.

In view of a particularly compact construction, it has proven to be advantageous that the prism erecting system comprises a Schmidt-Pechan prism system.

For the purpose of better understanding of the technology, it will be elucidated in more detail by means of the non-limiting exemplary embodiments shown in the figures below.

BRIEF DESCRIPTION OF THE DRAWINGS

These show in a respectively very simplified schematic representation:

FIG. 5 a cross-section of the focusing device of FIG. 4;

FIG. 6 a section along the line VI-VI in FIG. 5;

FIG. 7 a detail of a device for limiting the rotational movement of the focusing knob;

FIG. 8 a detail of the focusing device of FIG. 4 in a perspective representation and partially as an exploded view drawing;

FIG. 9 parts of the binocular of FIG. 1 in a front view as seen from the objective-side;

FIG. 10 a cross-section through a first tube of the binocular of FIG. 1 along the line A-A in FIG. 9;

FIG. 11 a cross-section through a first tube of the binocular of FIG. 1 along the line B-B in FIG. 9;

FIG. 12 a section along the line D-D in FIG. 9;

FIG. 13 a section through a first tube of the binocular of FIG. 1 along the line D-D in FIG. 9;

FIG. 14 a longitudinal section through a push rod of a focusing gear;

FIG. 20 a detail of the eyepiece-side end region of the binocular in a top view;

FIG. 21 the detail of the eyepiece-side end region according to FIG. 20 shown in a partially sectional view.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
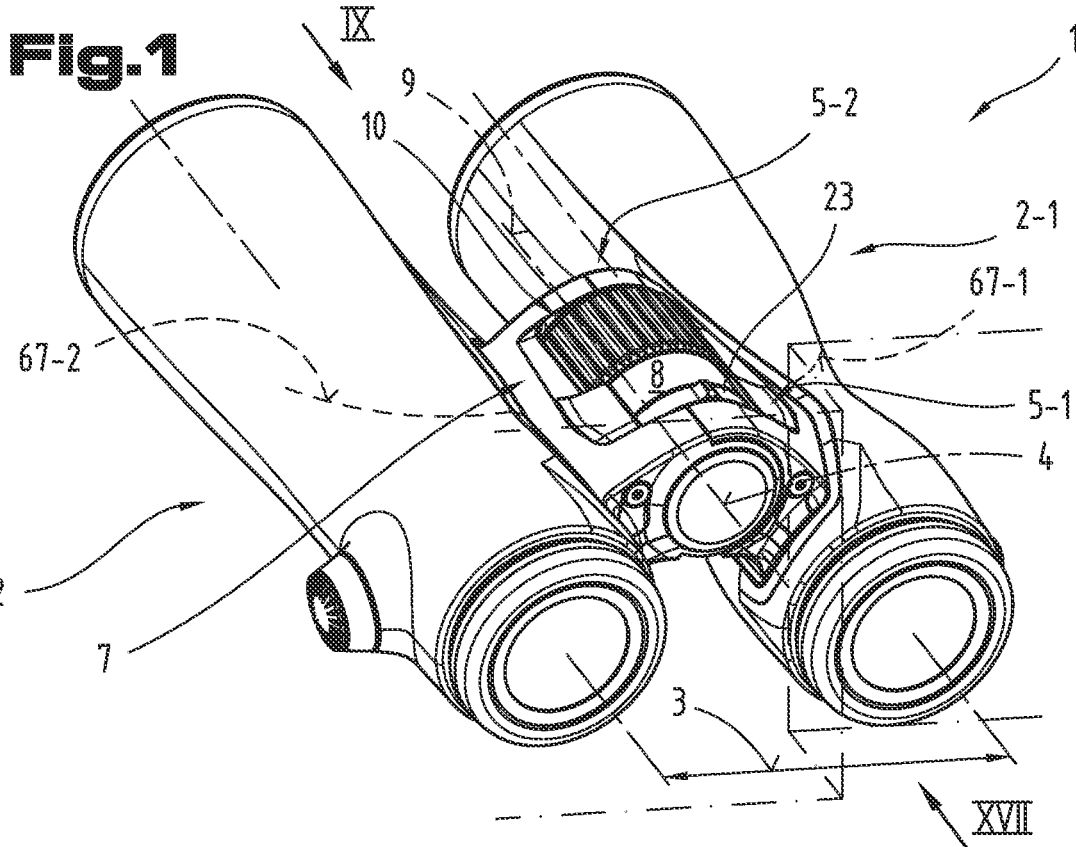
FIG. 1 a perspective view of a binocular.

FIG. 1 shows a field glass and/or a binocular 1 in a perspective view. It comprises a first tube 2-1 and a second tube 2-2 with optical systems accommodated therein for the enlarged representation of a distant object. For connection and parallel arrangement of the two tubes 2-1, 2-2, a hinged bridge 5 is formed between these. According to an exemplary embodiment of the binocular 1, a first hinged bridge 5-1 and a second hinged bridge 5-2 distanced therefrom in the longitudinal direction, both having a common hinge axis 4, are provided. Hence, the two tubes 2 can be pivoted against one another about the hinge axis 4 and thus the pupil distance and/or the interpupillary distance 3 can be adjusted for different users.

For focusing the image through the two optical systems in the two tubes 2-1, 2-2, a focusing device 7 is provided which is arranged between the first hinged bridge 5-1 and the second hinged bridge 5-2. The focusing device 7, in turn, comprises a housing 8 and a focusing knob 10 with a rotational axis 9. In this regard, the rotational axis 9 of the focusing knob 10 is arranged coaxially to the hinge axis 4 of the hinged bridges 5-1, 5-2. The focusing device 7 moreover comprises a diopter ring 23. The latter is also pivotable about the rotational axis 9.

Figure 2:
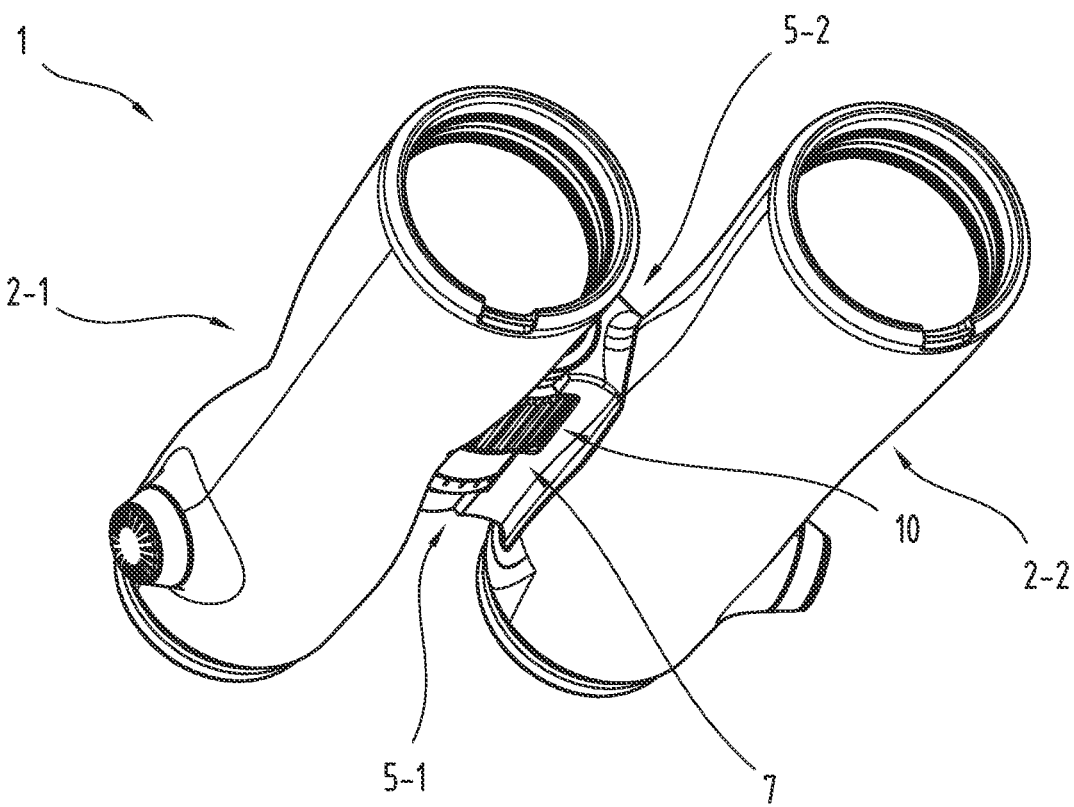
FIG. 2 the binocular of FIG. 1 in a perspective view from diagonally below.

FIG. 2 shows the binocular 1 according to FIG. 1 in a perspective view diagonally below. The focusing knob 10 formed with a knurled casing is accessible both from an upper side (FIG. 1) and from a bottom side (FIG. 2) of the binocular 1. Hence, a user is able, when gripping one of the two tubes 2-1, 2-2 to enclose it with their hand and to simultaneously act on the focusing knob 10 with their fingers both on the bottom side and on the upper side.

Figure 3:
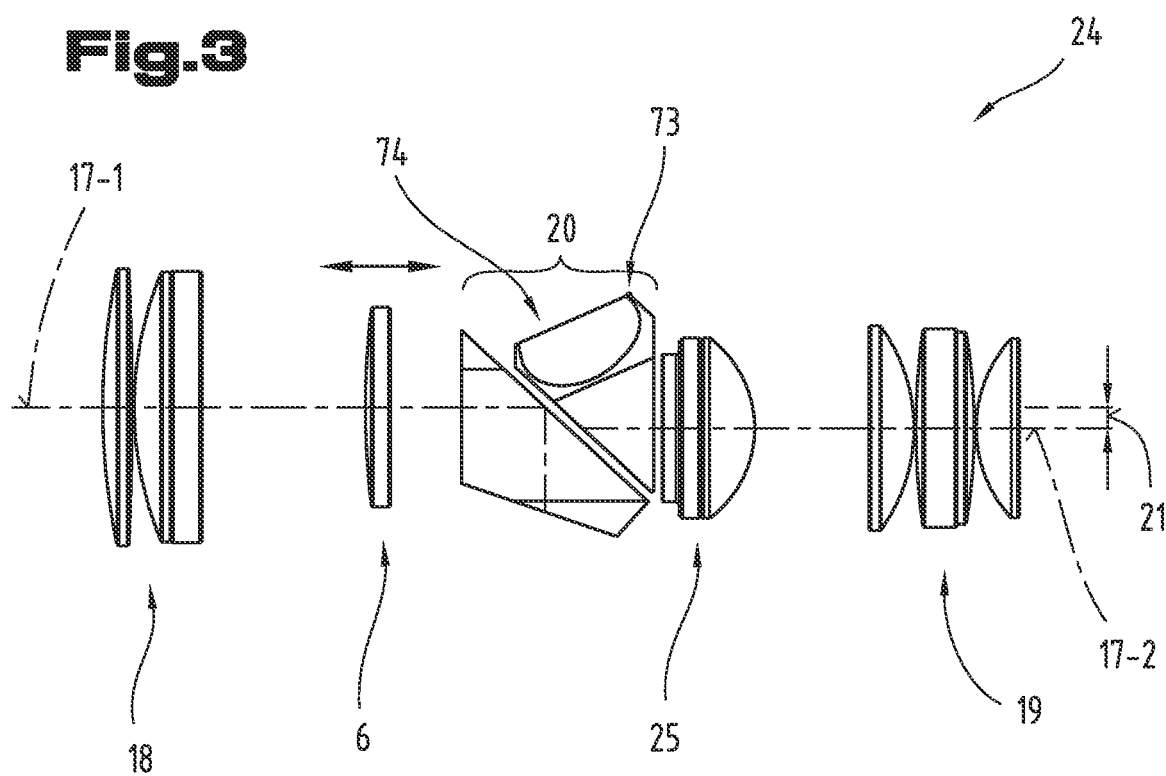
FIG. 3 an optical system of the binocular of FIG. 1.

FIG. 3 shows an optical system 24 of the two tubes 2-1, 2-2 of the binocular 1 by way of example.

In an order starting from the object side (left side in FIG. 3), the optical system 24 comprises an objective lens 18, a focusing lens 6, a prism erecting system 20, a field lens 25 and an eyepiece lens 19. For the purpose of clarification, it should be mentioned that where here and below the term "lens" is used in a facilitating manner, this can, where applicable, also be a system formed of multiple individual lenses. The prism erecting system 20 comprises an erecting prism of the type of a Schmidt-Pechan prism. At this point, it should be noted that in place of a Schmidt-Pechan prism, other prism erecting systems, such as an Abbe-Koenig prism or an Uppendahl prism, can also be used.

According to this exemplary embodiment, the prism erecting system 20 is dimensioned such that a parallel offset by a distance 21 is formed between a first optical axis 17-1 of the objective lens 18 and a second optical axis 17-2 of the eyepiece lens 19. The optical system 24 of the two tubes 2-1, 2-2 of the binocular 1 comprises a so-called internal focusing. In this regard, for focusing the image the internal focusing lens 6 is displaced in the axial direction of the optical axis 17-1, 17-2, wherein the rotational movement of the focusing knob 10 is converted via a focusing gear 11 (FIG. 4) into a longitudinal movement and corresponding displacement of the focusing lens 6.

Figure 4:
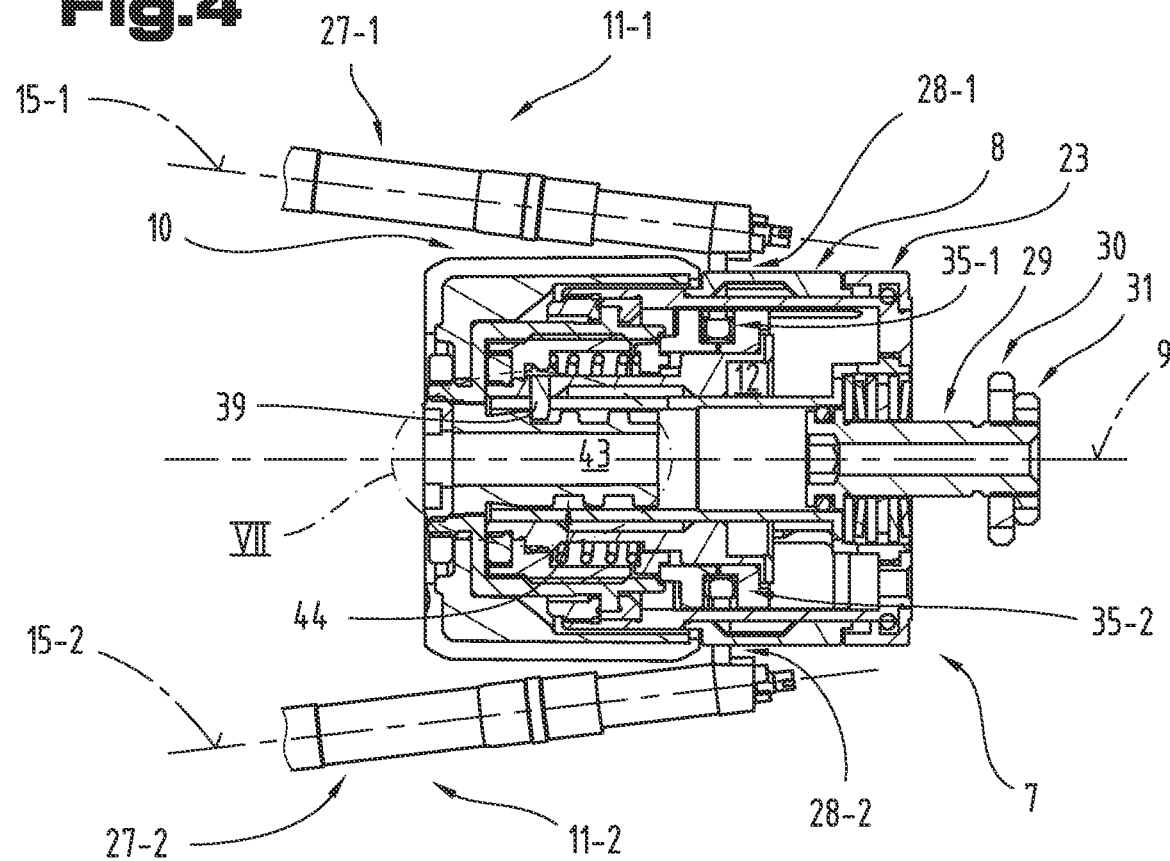
FIG. 4 a longitudinal section of the focusing device of the binocular of FIG. 1.

FIG. 4 shows a detail of a longitudinal section of the focusing device 7 of the binocular 1 with parts of the focusing gear 11-1, 11-2 leading to the two focusing lenses 6 (FIG. 3). The focusing device 7 as its central elements comprises the housing 8 and the focusing knob 10 mounted so as to be rotatable about the rotational axis 9. The housing 8 of the focusing device 7 is mounted on one of the two tubes 2-1, 2-2 so as to be prevented from rotating in relation thereto in the region of the hinged bridge 5-1. This mounting of the housing 8 of the focusing device 7 is carried out jointly on a hinge axis 29 of the hinged bridge 5 of the two tubes 2. The axle nut 30 and counter nut 31 serving for this purpose are also shown in FIG. 4. A threaded spindle 12 is arranged so as to be displaceable in the axial direction (rotational axis 9) in the inside of the housing 8. To transmit the axial adjustment movement of the threaded spindle 12 to the focusing lens 6 and/or the lens mount 26 of the focusing lens 6, the focusing device 7 has one push rod 27 in each case. For this purpose, a driver 28 mounted on an eyepiece-side end region of the push rod 27 engages with the threaded spindle 12.

An end of the push rod 27 can be arranged in one of the tubes 2-1, 2-2 and another end of the push rod 27 can be arranged in the hinged bridge 5.

FIG. 5 shows the cross-section of the focusing device 7 according to FIG. 4, wherein its housing 8, the threaded spindle 12 and the focusing knob 10 are shown in separated and/or dismantled condition.

The threaded spindle 12 comprises an inner sleeve 32 with a front adjusting disk 33 and a rear adjusting disk 34. Between end faces facing one another of the front adjusting disk 33 and the rear adjusting disk 34, one driver head 35 of the driver 28 is sufficient, wherein the front adjusting disk 33 on the one hand and the rear adjusting disk 34 come into contact on the driver head 35 and thus an axial displacement of the threaded spindle 12 is converted into a corresponding movement of the push rods 27-1, 27-2.

For mounting the front adjusting disk 33 and the rear adjusting disk 34 on the inner sleeve 32 of the threaded spindle 12 it is provided that the two adjusting disks 33, 34 are arranged on a cylinder jacket section of the inner sleeve 32, wherein the rear adjusting disk 34 comes into contact on a radially projecting shoulder of the inner sleeve 32. On the other hand, a compression spring 36 formed by a coil spring is mounted on the inner sleeve 32, said compression spring 36 in pretensioned condition keeping the front adjusting disk 33, the driver head 35 and the rear adjusting disk 34 pressed against each other.

An axle sleeve 37 is arranged in the inside of the housing 8 of the focusing device 7 and is connected to the housing 8. This axle sleeve 37 of the focusing device 7 serves as a straight guide for the threaded spindle 12. In this regard, the inner sleeve 32 of the threaded spindle 12 is displaceable on the axle sleeve 37 of the housing 8 in the axial direction.

For displacing the threaded spindle 12 on the axle sleeve 37 in the direction of the rotational axis 9, according to this exemplary embodiment, a slot 38 extending in the longitudinal direction of the axle sleeve 37 is provided (FIG. 6). And on the other hand, a guide pin 39 projecting inwards on an inner periphery of the inner sleeve 32 of the threaded spindle 12 is arranged, which engages in the slot 38 of the axle sleeve 37. This means that in the assembled state of the focusing device 7, the guide pin 39 reaches through the slot 38 of the axle sleeve 37. Thus, the movement of the threaded spindle 12 is limited to a translation 45 in the direction of the rotational axis 9 (FIG. 7). For this translation 45 to be effected by rotation of the focusing knob 10, a thread 40, which is contacted by a corresponding inner thread 41 of a drive bush 42 of the focusing knob 10, is formed on an outer periphery of the threaded spindle 12.

In the assembled state, the drive bush 42 of the focusing knob 10 is mounted in the housing 8 of the focusing device 7 so as to be rotatable. Thus, according to this exemplary embodiment, the focusing knob 10 is arranged to be stationary in the axial direction (rotational axis 9). Rotation of the focusing knob 10 thus effects an axial displacement of the threaded spindle 12 with the two adjusting disks 33, 34, whereby in further consequence—via the drivers 28-1, 28-2 and the push rods 27-1, 27-2—the focusing lenses 6 are displaced in the axial direction (FIG. 3).

FIG. 6 shows the focusing knob 10, the threaded spindle 12 and the housing 8 of the focusing device 7 in a sectional view according to FIG. 5. The representation corresponds to a viewing direction rotated by 90°. The slot 38 which extends in the longitudinal direction of the axle sleeve 37 and in which the guide pin 39 slides is clearly visible. The slot 38 can also be designed as an oblong hole.

It is provided in the described binocular 1 and/or the focusing device 7 that the rotational range and/or the rotational angle of the focusing knob 10 relative to the housing 8 of the focusing device 7 is limited by a stop on both ends of the rotational range, wherein the rotational range amounts to more than 360°. The stops 13-1, 13-2 are arranged so as to be offset from one another. For example, the stops 13-1, 13-2 can be offset from one another in relation to a longitudinal direction of the rotational axis 9 or about the rotational axis 9.

The focusing knob 10 comprises a stop bolt and/or a stop element 43, which is connected to the focusing knob 10 so as to be prevented from rotating relative thereto. In the assembled state of the focusing knob 10 and the housing 8 of the focusing device 7, this stop element 43 extends in the inside of the axle sleeve 37 of the housing 8. Just as the axle sleeve 37, the stop element 43 is arranged coaxially to the common rotational axis 9 of the focusing knob 10. In an outer cylinder jacket side of the stop element 43, therein, a threaded groove 44 is formed and/or molded in. In the assembled state, the guide pin 39 of the inner sleeve 32 of the threaded spindle 12 also reaches into the groove 44 (FIG. 4).

FIG. 7 shows a detail of the device for limiting the rotational movement of the focusing knob 10 in an end position shown in a perspective view according to FIG. 4. For the sake of clarity, in this regard, merely the stop element 43 of the focusing knob 10 and the guide pin 39 of the threaded spindle 12 are shown.

As shown by means of FIGS. 5 and 6, the guide pin 39 is moved into the direction of the longitudinal extent of the slot 38 of the axle sleeve 37 (in the direction of the rotational axis 9) during rotation of the focusing knob 10. Thus, it carries out just one translation 45. On the other hand, the stop element 43 carries out a pure rotational movement 46 during rotation of the focusing knob 10. The movement of the guide pin 39 relative to the stop element 43 is that of a screwing movement, wherein the guide pin 39 moves along in the helically formed groove 44. In this regard, the height of a winding of the groove 44 is equal to the thread height of the engaging threads of the threaded spindle 12 and the focusing knob 10 (thread 40, inner thread 41). It is provided that the arc length of the groove 44 (the length corresponding to a helix) is limited by a first stop 13-1 and a second stop 13-2. These stops 13-1, 13-2, are formed by a front and/or a rear inner wall of the groove 44, wherein these inner walls are preferably oriented approximately perpendicular with respect to a direction of the relative movement between the guide pin 39 and the groove 44. The rotational movement of the focusing knob 10 according finds an end at a precisely defined rotational angle, namely when the front stop 13-1 and/or the rear stop 13-2 comes into contact on the guide pin 39. The situation mentioned second is the one shown in FIG. 7, wherein the rear stop 13-2 rests against the guide pin 39.

In an alternative embodiment of the device for limiting the rotational movement of the focusing knob 10, the two stops 13-1, 13-2 are formed on the stop element 43 by separate stop bodies that radially project from an outer cylinder jacket side of the stop element 43. Such an alternative design of the stop element 43 accordingly also requires less material when it is produced.

The thus achieved limitation of the rotational movement and/or the rotational angle of the focusing knob 10 that can be achieved, in a particularly advantageous manner prevents jamming of the engaging threads 40, 41. By the formation of the groove 44 on the stop element 43 with a preselected arc length, hence, a rotational angle range precisely defined in its end positions for the adjustment of the focusing knob 10 and thus also the adjusting range of the focusing lenses 6 can be exactly prescribed. Thereby, unintended jamming of the focusing device 7, as would be equivalent to tightening a screw connection, can be prevented.

By means of the representations in FIGS. 5, 6 and FIG. 8, below, the design of a device for diopter adjustment on the focusing device 7 of the binocular 1 is described. FIG. 8 shows a detail of the focusing device 7 (FIG. 4) in a perspective representation and partially shown as an exploded view drawing. On an eyepiece-side end region on the housing 8 the diopter ring 23 is mounted so as to be pivotable with respect to the rotational axis 9 (FIG. 5, 6).

As already mentioned in the context of the description of FIG. 5, the two adjusting disks 33, 34 are arranged on a cylinder jacket section of the inner sleeve 32 of the threaded spindle 12. However, corresponding to their mounting, the two adjusting disks 33, 34 are also pivotable on the inner sleeve 32 with respect to the rotational axis 9, wherein this pivoting can be effected by actuation of the diopter ring 23. As can be clearly seen from the representation in FIG. 8, the diopter ring 23 comprises a driver arm 47. The driver arm 47 extends in parallel to the rotational axis 9 in the object-side direction and projects from the annular section of the diopter ring 23. Corresponding to the cross-section of the driver arm 47, the adjusting disks 33, 34 have recesses 48-1, 48-2 on their periphery. By the driver arm 47 of the diopter ring 23 engaging in the recesses 48-1, 48-2 of the adjusting disks 33, 34, these can be pivoted in relation to the rotational axis 9 by actuating the diopter ring 23.

As was also already elucidated above by means of the description of FIGS. 5 and 6, one driver head 35 of each of the drivers 28 of the two push rods 27-1, 27-2 is carried along between facing end faces of the front adjusting disk 33 and the rear adjusting disk 34 and in this way a corresponding displacement of the focusing lenses 6 takes place during an axial displacement of the threaded spindle 12. Independent of an axial displacement of the threaded spindle 12, an additional displacement of one of the two focusing lenses 6 can now also be achieved by pivoting the diopter ring 23. For this purpose, sections and/or partial areas of the end faces of the two adjusting disks 33, 34 coming into contact with the driver heads 35 are formed to extend differently. Specifically, one of the two partial areas has circular sides, while the other partial area has sides extending so as to be thread-like and/or helical. Accordingly, in a first partial area, a helically extending first sliding way 49-1 is formed and in a second partial area, a circular second sliding way 49-2 is formed by the two adjusting disks 33, 34.

To illustrate this, FIG. 8 shows the arrangement of the two adjusting disks 33, 34 also from the back side, i.e. in a side view marked with an "R". According to this design of the two adjusting disks 33, 34, when the diopter ring 23 is actuated an additional displacement of the focusing lens 6 of the first tube 2-1 is carried out (sliding way 49-1 extending in a thread-like manner). However, pivoting of the arrangement of the two adjusting disks 33, 34 when the diopter ring 23 is actuated does not effect a displacement of the focusing lens 6 of the second tube 2-2 (second sliding way 49-2 extending arcuately).

Moreover, it should be noted with regard to the constructional design of the diopter ring 23 that its annular section is arranged on the outer periphery of the housing 8 of the focusing device 7. The driver arm 47 of the diopter ring 23, for cooperating with the recesses 48-1, 48-2 on the adjusting disks 33, 34, reaches into the inside of the housing 8 formed to have a cylinder jacket shape. As can more clearly be seen in the cross-section according to FIG. 6, for this purpose the driver arm 47 comprises a radially extending section with which it is connected to the annular section of the diopter ring 23. For this purpose, the housing 8 of the focusing device 7 comprises a slot 50 extending across a partial area of the periphery in the eyepiece-side end region of its section formed to have a cylinder jacket shape, which slot 50 the driver arm 47 reaches through (FIG. 8)

Moreover, in the section formed to have a cylinder jacket shape of the housing 8, a first window 51-1 and a second window 51-2 are formed (FIGS. 5, 8), through each of which one of the two drivers 28-1, 28-2 of the focusing gear 11 extends. Hence, the driver heads 35-1, 35-2 of the drivers 28-1, 28-2 can engage in the adjusting disks 33, 34 and an axial displacement can be transmitted to the push rods 27-1, 27-2 (FIG. 4).

FIG. 9 shows a representation of parts of the binocular 1 in a front view as viewed from the object side in a direction of view oriented in parallel to the hinge axis 4. Of the binocular 1, merely the focusing device 7 (recognizable by the focusing knob 10 and the focusing gear 11-1) with the driver 28-1, the push rod 27-1 and the lens mount 26-1 of the focusing lens 6 of the first tube 2-1 are shown. Additionally, one of the lenses of the eyepiece 19 is shown. The optical axes parallel to the hinge axis 4 and/or to the rotational axis 9, i.e. the first optical axis 17-1 of the objective lens 18 and the second optical axis 17-2 of the eyepiece 19, appear in this representation as a point in the drawing plane (projecting). As already mentioned in the description of FIG. 3, the first optical axis 17-1 of the objective lens 18 and the second optical axis 17-2 of the eyepiece 19 are offset parallel to each other by the distance 21.

It is provided that the first optical axis 17-1 of the objective lens 18, the second optical axis 17-2 of the eyepiece 19 and the hinge axis 4 of the hinged bridge 5 lie on a common plane 22. This analogously applied to the arrangement of the optical system 24 in the second tube 2-2 which is arranged symmetrically to the first tube 2-1.

FIG. 10 shows a cross-section through the first tube 2-1 in relation to a sectional plane formed by the plane 22 (FIG. 9). This means that the representation corresponds to a direction perpendicular to the plane 22 containing the first optical axis 17-1 of the objective lens 18, the second optical axis 17-2 of the eyepiece 19 and the hinge axis 4. The orientation of the prism erecting system 20 in FIG. 10 corresponds to the one shown in FIG. 3. Likewise, the distance 21 between the first optical axis 17-1 of the objective lens 18 and the second optical axis 17-2 of the eyepiece 19 is shown undistorted in the figure.

FIG. 11 shows a cross-section of the first tube 2-1 in relation to a section plane "B-B" (FIG. 9) containing the second optical axis 17-2 of the eyepiece 19 and being perpendicular to the plane 22. As this representation of the tube 2-1 shows, an outer side 52-1 of a tube housing 57 comprises a waist 53 in the region of the prism erecting system 20.

Figure 15:
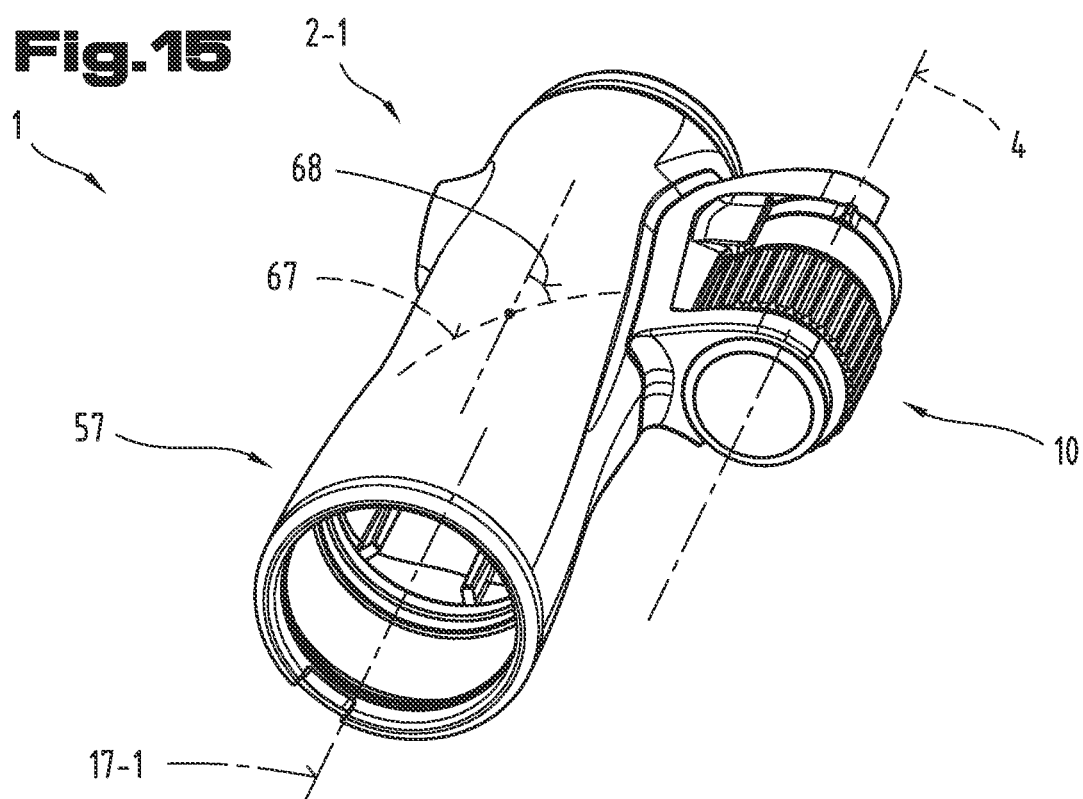
FIG. 15 a perspective view of a tube of the binocular of FIG. 1.
Figure 16:
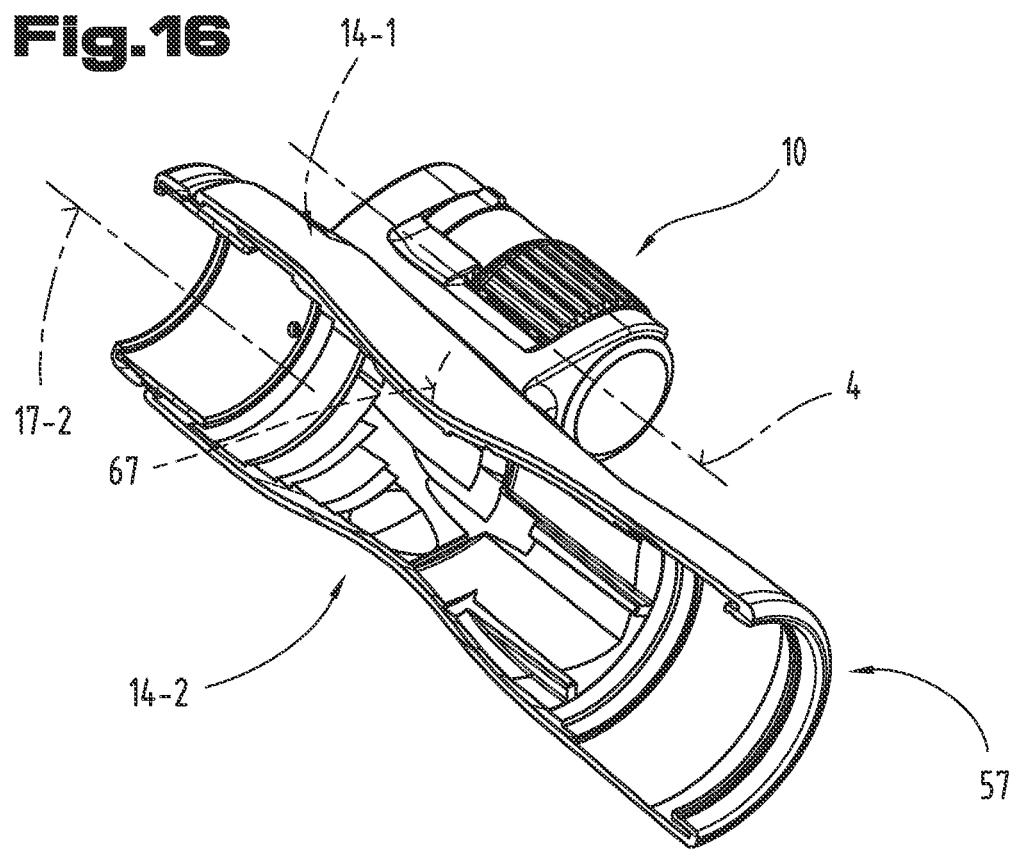
FIG. 16 a longitudinal section through the tube of FIG. 15.

The waist 53 is designed with a peripheral shape that deviates from a circular shape. A section extending on an upper side of the tube 2-1 is formed as a retaining recess 14-1 for a section of a finger following the waist 53, as is shown in FIGS. 15 and 16. A section extending on a bottom side of the tube 2-1 is formed as a retaining recess 14-2 for a section of a thumb of a user following the waist 53.

A plane 66 extending through the retaining recess 14-1 on the upper side of the tube 2-1 and through a retaining recess 14-2 on the bottom side of the tube 2-1 extends through the prism erecting system 20 and/or cuts it.

As can also be seen from FIGS. 15 and 16, each retaining recess 14-1, 14-2 can have a concave cross-section transversely to the longitudinal direction of the waist 53.

A longitudinal direction 67 of each retaining recess 14-1, 14-2 can extend obliquely to a longitudinal extent of the tube 2-1 (optical axes 17-1, 17-2). Moreover, a longitudinal direction 67-1 of the retaining recess 14-1 extending on the upper side and/or a longitudinal direction 67-2 of the retaining recess 14-2 extending on the bottom side can enclose at least one angle 68 between 35° and 90° with a direction of the hinge axis 4. In this regard, the longitudinal direction 67 of a retaining recess 14 shall be understood as the direction of an extent of the valley floor of the retaining recess 14, as is indicated by dashed lines in FIGS. 15 and 16. This means that the sequence of the points of the local minimums of radial distances from intersection curves containing the optical axis 17-1 and/or 17-2 through the outer side 52 of the tube housing 57 characterizes the longitudinal direction 67.

Moreover, each retaining recess 14-1, 14-2 of each tube 2-1 can have a first eyepiece-side end region located closer to the eyepiece 19 and a second objective-side end region located closer to the objective lens 18. The distance between the respective eyepiece-side end regions of the retaining recesses 14-1, 14-2 of the two tubes 2-1, 2-2 is smaller than the distance between the respective objective-side end regions of the retaining recesses 14-1, 14-2 of the two tubes 2-1, 2-2. Each tube 2-1, 2-2 in the region of its waist 53 has two retaining recesses 14-1, 14-2 opposite to one another, in particular two retaining recesses 14-1, 14-2 arranged on sections of the tube 2-1, 2-2 rotated by 180° with respect to one another. This means that the retaining recesses 14-1, 14-2 of the binocular 1 are offset to each other by 180° relative to the optical axes 17-1, 17-2 with respect to a rotation.

The retaining recesses 14-1, 14-2 of the two tubes 2-1, 2-2 can taper towards one another in a V-shape, wherein a retaining recess 14-1, 14-2 of a first one of the two tubes 2-1, 2-2 forms a first limb of the V and a retaining recess 14-1, 14-2 of a second one of the two tubes 2-1, 2-2 forms a second limb of the V (FIG. 1). A tip of the V can be located in the region of the focusing knob 10. Alternatively, imaginary extensions of the longitudinal extents 67-1, 67-2 of the retaining recesses 14-1, 14-2 maintaining an orientation of the retaining recesses 14-1, 14-2 can extend through the focusing knob 10, or the focusing knob 10 can be arranged between an imaginary extension of the longitudinal extents 67-1, 67-2 maintaining the orientation of the retaining recesses 14-1, 14-2.

A value of diameter 54 of the waist 53 measured perpendicularly with respect to the plane 22 is in a ratio of less than 80%, preferably approx. 67%, to a value of a diameter 55 of an imaginary cylinder jacket 56 circumscribing the outer side 52 of the tube 2 (FIG. 11). The outer sides 52 of the two tubes 2-1, 2-2 are preferably formed to be waisted such that a ratio of the diameter 54 of the waist 53 to the corresponding diameter 55 of the cylinder jacket 56 surrounding the outer side 52 is in a range between 0.60 and 0.80 (and/or between 60% and 80%).

In other words, a cross-section through each of the tubes 2-1, 2-2 in the region of the waist 53, which cross-section is aligned normal to the first plane 22 and to the direction of the optical axis 17-1, 17-2 (corresponds to the plane 66), has its narrowest part with respect to a direction perpendicular to the first plane 22 (FIGS. 9, 11). A ratio of a clear height 69 of the narrowest part of the tube 2-1, 2-2 normal to the first plane 22 to a maximum free diameter 70 of the objective lens 18 has a value of below 80%, in particular of between 60% and 80%. As mentioned above—as an introduction to the figure description of FIG. 11—the waist 53 has a peripheral shape that deviates from a circular shape. Thus, diameters of the tubes 2-1, 2-2 in the region of the waist 53, measured perpendicularly with respect to the optical axes 17-1, 17-2,—as opposed to a circular cross-section—depending on the direction have different values. This means that the diameter 54 of the waist 53 measured perpendicularly with respect to the plane 22 corresponds to the narrowest part and diameters measured in other directions have higher values.

The waisting of the outer sides 52 of the tubes 2-1, 2-2 is advantageous since it allows for particularly comfortable while at the same time secure gripping and holding of the binocular 1 by a user.

According to a first example of the design of the outer sides 52 of the tubes 2-1, 2-2, the diameter 55 has a value of 51.5 mm and the diameter 54 of the waist 53 has a value of 35 mm. The value of the maximum free diameter 70 of the objective lens 18 in these tubes 2-1, 2-2 amounts to 42 mm and the value of the clear height 69 of the narrowest part amounts to 29 mm.

A second exemplary embodiment of the tubes 2-1, 2-2 provides as corresponding values: The value of the diameter 55 of the imaginary cylinder jacket 56 circumscribing the outer sides 52 of the tube 2 equals 44.5 mm; the value of the diameter 54 of the waist 53 equals 33.5 mm; the value of the maximum free diameter 70 of the objective lens 18 equals 32 mm and the value of the clear height 69 of the narrowest part of the tube equals 25.5 mm.

The corresponding values of the two examples are summarized in the following table in a clear manner. In this regard, columns 6 to 9 of this table contain additional values of characteristic ratios from the sizes in columns 2 to 5.

| example | D55 [mm] | D54 [mm] | D69 [mm] | D70 [mm] | V54/55 | V54/70 | V69/70 | V(55 − 54)/70 |
|---|---|---|---|---|---|---|---|---|
| 1 | 51.5 | 35 | 29 | 42 | 0.68 | 0.83 | 0.69 | 0.39 |
| 2 | 44.5 | 33.5 | 25.5 | 32 | 0.75 | 1.05 | 0.80 | 0.34 |

The column headers in the table mean:

D55: diameter 55 of the imaginary cylinder jacket 56 circumscribing the outer side 52 of the tube 2;

D54: diameter 54 of the waist 53 measured perpendicularly with respect to the plane 22;

D69: clear height 69 of the narrowest part of the tubes 2-1, 2-2 measured perpendicularly with respect to the plane 22;

D70: maximum free diameter 70 of the objective lens 18;

V54/55: ratio of diameter 54 to diameter 55;

V54/70: ratio of diameter 54 to diameter 70;

V69/70: ratio of diameter 69 to diameter 70;
V(55–54)/70: ratio of the difference of diameter 55 and diameter 54 to diameter 70.

The outer design of the tubes 2-1, 2-2 of the binocular 1 is characterized particularly well by the ratio of the difference of the two diameters 55, 54 to the maximum free diameter 70 of the objective lens 18 (table, column 9). In the binocular 1 according to the technology, this ratio is in a range larger than 0.20, preferably in a range of between 0.30 and 0.60.

Moreover, at this point, values of the distance 21, by which the first optical axis 17-1 of the objective lens 18 and the second optical axis 17-2 of the eyepiece 19 are offset parallel to each other, should be mentioned as well. In example 1, the distance 21 has a value of 3.2 mm and in example 2 it has a value of 2.9 mm. Values of the distance 21 in a range of 2 mm to 10 mm prove to be particularly advantageous.

Figure 17:
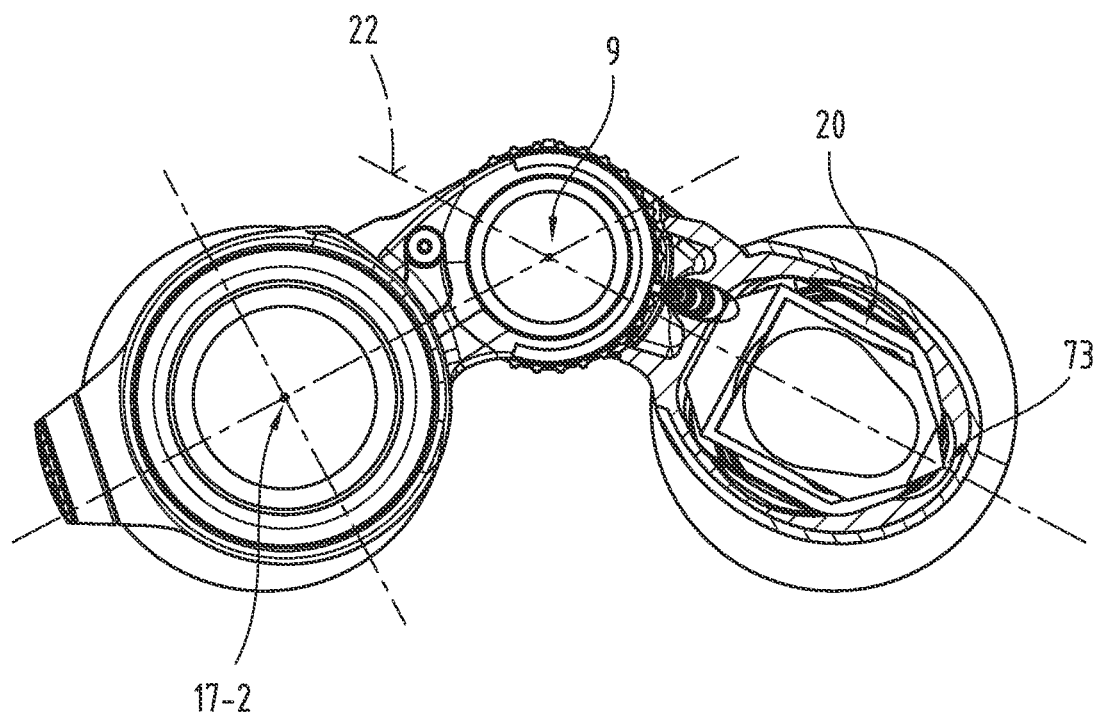
FIG. 17 a section along the line IX-IX in FIG. 1.

This design of the outer shape of the binocular 1 and/or the outer shape of the tube housing 57 is favored by a particular design of the prisms of the prism erecting system 20 also being realized according to this exemplary embodiment. As compared to the theoretical basic shape of the two prisms of a Schmidt-Pechan prism, in the present design, edges projecting in the radial direction—with respect to the optical axis 17-1, 17-2—are replaced by chamfers, which can best be seen in FIG. 3, but also in FIG. 17, FIG. 12 shows a cross-section of the binocular 1 in a reduced way of representation according to FIG. 9. The shown parts of the binocular 1, like in FIG. 9, are limited to a lens representing the eyepiece 19 and to the focusing device 7 with the focusing gear 11 and the lens mount 26 of the focusing lens 6 (FIG. 3). The cross-section shown in FIG. 12 corresponding to a sectional plane determined by a plane 59 containing the hinge axis 4 (and/or the rotational axis 9) and the longitudinal axis 15 of the push rod 27. The push rod 27 is aligned obliquely with respect to the hinge axis 4, wherein—according to this exemplary embodiment—its longitudinal axis 15 encloses an acute angle 58 with a value of 7° with the hinge axis 4. The value of the angle 58 is preferably selected from a range between 0° and 30°. However, with respect to the first optical axis 17-1 of the objective lens 18 and with respect to the second optical axis 17-2 of the eyepiece 19, the longitudinal axis 15 is arranged in a so-called skew position.

The arrangement of the different axes relative to one another can better be seen in the representation of FIG. 9. The hinge axis 4 on the one hand spans the common plane 22 with the optical axes 17-1, 17-2 and on the other hand spans the common plane 59 with the longitudinal axis 15 of the push rod 27. The two planes, i.e. the plane 22 and the plane 59, together enclose an angle 60 having a value from a range of between 0° and 30°, in particular between 10° and 30°. In the shown example, the angle 60 has a value of 12°. This arrangement or alignment of the push rod 27 is realized by a corresponding bore in the tube housing 57, said bore extending from the region of the hinged bridge 5-1, 5-2 and/or the region of the focusing device 7 to the lens mount 26 of the focusing lens 6 (FIG. 13). The push rod 27 can thus be displaced back and forth in the tube housing 57 in the direction of its longitudinal axes 15.

FIG. 13 shows a cross-section of the first tube 2-1 of the binocular 1 according to a sectional plane formed be the plane 59. This means that the sectional plane contains the hinge axis 4 and the longitudinal axes 15 of the push rod 27-1 (FIG. 9). As mentioned above, the tube housing 57 comprises a bore and/or a guide tunnel 61, in which the push rod 27-1 is held. The guide tunnel 61 accordingly extends from the inside of the tube housing 57, in the region of the lens mount 26 of the focusing lens 6, up into the region of the first hinged bridge 5-1 where it opens to the outside at an eyepiece-side end fact of the first hinged bridge 5-1. Moreover, a window 62 is formed in the tube housing 57 between the guide tunnel 61 and the focusing device 7, directed in the radial direction towards the hinge axis. The driver 28-1 reaches through this window 62 from the push rod 27-1 into the housing 8 of the focusing device 7 (FIG. 12). The arrangement of the push rods 27-1, 27-2 in the binocular 1 is thus provided such that these extend from the inside of the tube housing 57 up into the first hinged bridge 5-1.

The design of the binocular 1 with the described, obliquely arranged push rods 27 and the corresponding guide tunnels 61 in the tube housings 57 of the tubes 2-1, 2-2 in particular during assembling the binocular 1 offers the possibility that hence, the adjustment of the focusing unit can be carried out in a simple manner. Such an adaption is possible in that the eyepiece-side end region of the push rod 27 is acted upon through the eyepiece-side end of the guide tunnel 61 by means of a suitable tool. As will be described below by means of FIG. 14, the push rods 27 are adjustable in their length in the manner of a binocular. When assembling the binocular 1, hence, both for focusing and for dioptric correction, a middle basic position for the required adjustment ranges can be set.

FIG. 14 shows the push rod 27-1 shown as a longitudinal section with respect to its longitudinal axis 15-1. The push rods 27-1, 27-1 are preferably designed straightly. The push rod 27-1 comprises an inner rod 63 as its main component and a push sleeve 64. FIG. 14 additionally shows a sliding bush 65, by means of which the push rod 27-1 is held in the guide tunnel 61. The inner rod 63 and the push sleeve 64 are preferably designed having interlocking threads and can hence be adjusted in their relative position to each other in the direction of the longitudinal axis 15-1. The driver 28-1 is affixed on an eyepiece-side end of the push sleeve 64. On the other hand, an objective-side end of the inner rod 63 is formed having a joint head arrangement 71. This joint head arrangement 71, in turn, engages with a pivot socket 72 of the lens mount 26 of the focusing lens 6. According to this exemplary embodiment, the joint socket 72 is formed by a fork laterally projecting from the lens mount 26 of the focusing lens 6 (also see FIGS. 9, 12). When adjusting the push rod 27-1 in the direction of the longitudinal axis 15-1, hence, a correcting movement in the radial direction between the joint head arrangement 71 and the joint socket 72 designed as a fork is possible. The joint head arrangement 71 is preferably also designed having a pre-tensioned spring element and a disk, by which a contact free from play between the corresponding contact sides of the joint socket 72 and the joint head arrangement 71 is achieved in both adjustment directions. Thus, mechanical absence of play can be achieved overall for the transmission of movements from the focusing knob 10 to the focusing lens 6.

Figure 18:
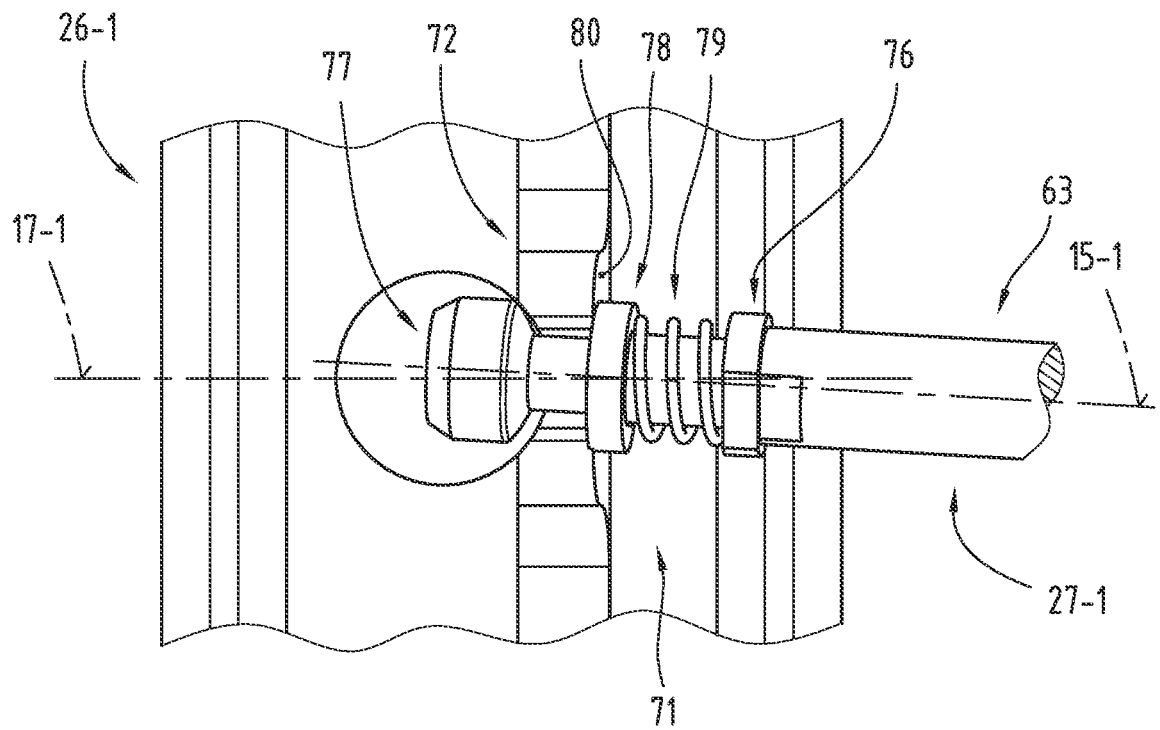
FIG. 18 a detail of the lens mount with the joint head arrangement of the push rod according to FIG. 12, according to a direction of view parallel to the line XIX-XIX as shown in FIG. 9.
Figure 19:
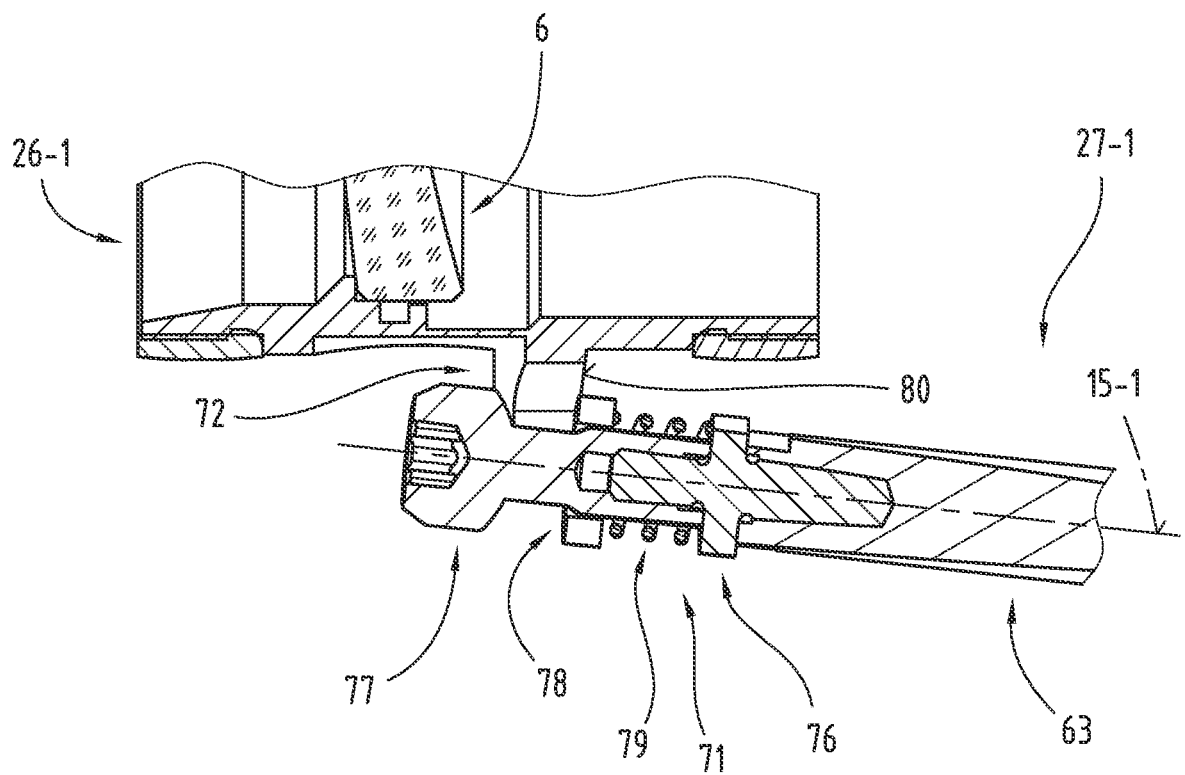
FIG. 19 a cross-section of the detail according to FIG. 18.

The coupling and/or the mutual engagement of the push rod 27 and the lens mount 26 of the focusing lens 6 is elucidated in further detail by means of FIGS. 18 and 19. FIG. 18 shows a detail of the lens mount 26 with the joint head arrangement 71 of the push rod 27 according to FIG. 12. The representation corresponds to a lateral view onto the lens mount 26 according to a direction of view parallel to the sectional plane "XIX-XIX" as indicated in FIG. 9.

FIG. 19 shows a cross-section corresponding to a sectional plane containing the optical axis 17-1 with the focusing lens 6, the joint socket 72, the lens mount 26 and the joint head arrangement 71 of the push rod 27. The joint head arrangement 71 is affixed on the inner rod 63 of the push rod 27 by means of a joint head base 76. For this purpose, the joint head base 76 is screwed into the objective-side end of the inner rod 63. Further, a cylinder-shaped section of a joint head 77 is mounted on the joint head base 76. Further, a sliding disk 78 and a compression spring 79 are mounted on the cylinder-shaped section of the joint head 77. In this compression spring 79 is arranged such that it is supported on the hand on the sliding disk 78 and on the other hand on a disk-shaped projection of the joint head basis 76. The compression spring 79 is installed in the pre-tensioned state and hence the fork-shaped joint socket 72 of the lens mount 26 of the focusing lens 6 is clamped and/or spanned between the sliding disk 78 and the joint head 77. The transmission of a movement from the push rod 27 onto the lens mount 26 of the focusing lens 6 can thus be carried out free from mechanical play. Further, when the lens mount 26 is adjusted, a—with respect to the optical axis 17-1—radial correcting movement of the joint head 77 in the joint socket 72 is possible. Moreover, in the design of the joint socket 72 of the lens mount 26 it is provided that a flank 80 on the eyepiece side and/or facing the sliding disk 78 has an inclination and/or oblique position corresponding to the longitudinal axis 15 of the push rod 27. Hence, an approximately full-surface contact of the sliding disk 78 on the flank 80 of the joint socket 72 can be achieved. In particular, it is prevented that jamming of the sliding disk 78 on the cylinder-shaped section of the joint head 77 occurs.

Moreover, with respect to the inner rod 63 and the push sleeve 64 of the push rod 27-1, it is provided that the inner rod 63 reaches through the push sleeve 64 in the direction of the longitudinal axis 15-1 and protrudes from it beyond the eyepiece-side end region. A slot in the eyepiece-side end region of the inner rod 63 allows influence for example by means of a screwdriver with which a change in length and/or an adjustment setting can be carried out on the push rod 27-1.

As can be seen from a combination of FIG. 10 and FIG. 17, the tube 2-1 in a cross-section of the tube 2-1 corresponding to the first plane 22 has the largest distance between opposite inner sides and thus its broadest part in a section covering the prism erecting system 20 (in a longitudinal region overlapping with the prism erecting system 20). A cross-section normal to the first plane 22 and to the direction of the optical axis through the tube 2-1 in the region of the waist 53 thus has its broadest part in an intersection area of the tube 2-1 with the first plane 22. This "broadest part" which is addresses here corresponds to the "narrowest part" mentioned above, as shown in FIG. 11 (corresponding to plane 66).

A tip 73 of a roof edge 74 of the prism erecting system 20 is arranged so as to be in a region of the broadest part and to point outwards (FIG. 10). In this regard, the shortest distance between this tip 73 of the roof edge 74 and the inner wall of the tube 2-1 is smaller than the shortest distance between the tip 73 of the roof edge 74 and the optical axis 17-1 of the objective lens 18 and/or to the optical axis 17-2 of the eyepiece 19.

The tip 73 of the roof edge 74 of the prism erecting system 20 is thus arranged so as to be in the region of the broadest part and to point outwards such that the shortest distance between the tip 73 of the roof edge 74 and the inner wall of the tube 2-1 is smaller than the shortest distance between the tip 73 of the rood edge 74 and a surface 75 of the prism erecting system 20 opposite to the tip 73 of the roof edge 74.

By means of FIGS. 20 and 21, below, an alternative exemplary embodiment of a device for dioptric correction in the binocular 1 is described. FIG. 20 shows a detail according to a top view onto the eyepiece-side end region of the binocular 1. In this regard, the representation corresponds to a direction of view onto the binocular 1 parallel to the longitudinal axis 15 of the push rod 27 (FIG. 12). In this exemplary embodiment of the device for dioptric correction, a diopter ring 81 is provided which is arranged asymmetrically to the hinge axis 4 of the tubes 2-1, 2-2 of the binocular 1. This diopter ring 81 is arranged in a region between the hinge axis 4 and the first tube 2-1. It is positioned in particular in the region of the first hinged bridge 5-1 and in this respect in particular positioned close to the eyepiece-side end region of the push rod 27-1 (FIGS. 1, 12).

FIG. 21 shows a detail of the hinged bridge 5-1 of the binocular 1 with the diopter ring 81 in a partially sectional view. The representation, in turn, corresponds to a direction of view parallel to the longitudinal axis 15 of the first push rod 27-1. According to this exemplary embodiment of the binocular 1, a diopter gear 82 is provided between the diopter ring 81 and the inner rod 63 of the push rod 27-1. In this exemplary embodiment, it is formed by a gear drive. For this purpose, a first gear 83 is connected to the diopter ring 81 and an actuation of the diopter ring 81 is hence transmitted onto a second gear 84. A so-called sleeve coupling is formed between the second gear 84 and the eyepiece-side end region of the inner rod 63. This means that the second gear 84 engages in an interlocking manner on the end of the inner rod 63 such that a rotational movement is transmitted to the inner rod 63. According to this exemplary embodiment, the end of the inner rod 63 is formed so as to have a triangular profile. However, the second gear 84 is not firmly connected to the inner rod 63 but the inner rod 63 can move in the direction of the longitudinal axis 15-1 relative to the gear 84. Further, due to the thread formed between the push sleeve 64 and the inner rod 63, in case of a rotation of the gear 84, an additional axial displacement of the inner rod 63 with the joint head arrangement 71 in the direction of the longitudinal axis 15-1 takes place. In this regard, the diopter ring 81 and the gears 83, 84 of the diopter gear 82 are not displaced in the direction of the longitudinal axis 15-1. Furthermore, an actuation of the focusing knob 10 and thus an axial displacement of the entire push rod 27-1 also remains without an interaction on the setting of the diopter ring 81 and/or the diopter gear 82.

The exemplary embodiments show possible embodiment variants, and it should be noted in this respect that the technology is not restricted to these particular illustrated embodiment variants of it, but that rather also various combinations of the individual embodiment variants are possible and that this possibility of variation owing to the teaching for technical action provided by the present technology lies within the ability of the person skilled in the art in this technical field.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A binocular having two tubes, which are connected to one another by means of a hinged bridge pivotable about a hinge axis for adjusting the interpupillary distance, wherein in the two tubes, in each case, a beam path is formed by an objective lens, an eyepiece and a prism erecting system, wherein a first optical axis of the objective lens and a second optical axis of the eyepiece are offset parallel to each other by a distance so that these axes do not coincide, characterized in that the first optical axis of the objective lens and the second optical axis of the eyepiece lie in a common first plane with the hinge axis of the hinged bridge, wherein said prism erecting system comprises a Schmidt-Pechan prism system or an Abbe-Koenig prism, and wherein a tip of a roof section, consisting of two faces meeting at a 90° angle, of the prism erecting system is arranged facing outwards relative to the hinge axis.

2. The binocular according to claim 1, wherein an outer side of each tube comprises a waist formed with a circumferential shape deviating from a circular shape in a region of the prism erecting system, wherein a section extending on an upper side of the tube is formed as a first retaining recess following the waist for a section of a finger and a section extending on a bottom side of the tube is formed as a second retaining recess following the waist for a section of a thumb of a user.

3. The binocular according to claim 2, wherein outer sides of the two tubes each comprise the waist in a section of their longitudinal extent parallel to the optical axis, in a region of the prism erecting system in a direction perpendicular with respect to the first plane.

4. The binocular according to claim 2, wherein a cross-section normal to the first plane and to the direction of the optical axis through each of the tubes in the region of the waist has its narrowest part in an intersection area of the respective tube with a plane extending normal to the direction of the first optical axis of the objective lens, wherein a ratio of a diameter of the narrowest part of the tube normal to the first plane to a diameter of the housing in the area of the objective lens has a value which is lower than 0.80, in particular has a value amounting to between 0.60 and 0.80.

5. The binocular according to claim 1, wherein an axially displaceable focusing means is arranged in each one of the two tubes and a common focusing device for displacing the focusing means is formed, wherein the focusing device comprises a housing and a focusing knob rotatable about a rotational axis and the rotational axis is arranged coaxially to the hinge axis, and wherein the focusing knob is rotationally coupled to a focusing gear and each focusing gear comprises a push rod, by means of which each focusing gear is coupled to one of the two focusing means, wherein a direction of a longitudinal axis of the push rod encloses an acute angle with a direction of the hinge axis.

6. The binocular according to claim 5, wherein the hinge axis spans a second plane with the longitudinal axis of the push rod, wherein the first plane and the second plane commonly enclose an acute angle with a value between 0° and 30°, in particular between 10° and 30°.

7. The binocular according to claim 5, wherein a direction of the longitudinal axis of the push rod of each tube is aligned skew with respect to a direction of an optical axis of the tube.

8. The binocular according to claim 6, wherein a direction of the longitudinal axis of the push rod of each tube is aligned skew with respect to a direction of an optical axis of the tube.

9. The binocular according to claim 2, wherein each retaining recess has a concave cross-section transversely to the longitudinal direction of the waist.

10. The binocular according to claim 2, wherein a direction of a longitudinal extent of each retaining recess extends obliquely to a direction of a longitudinal extent of the tube.

11. The binocular according to claim 2, wherein each retaining recess of each tube has a first eyepiece-side end region located closer to the eyepiece and a second objective-side end region located closer to the objective lens, wherein the distance between the respective eyepiece-side first end regions of the retaining recesses of the two tubes is smaller than the distance between the respective objective-side second end regions of the retaining recesses of the two tubes.

12. The binocular according to claim 2, wherein each tube in the region of its waist has two retaining recesses which are opposing each other, in particular two retaining recesses which are arranged on sections of the tube rotated by 180° with respect to one another.

13. The binocular according to claim 2, wherein the retaining recesses of the two tubes taper towards one another in a V-shape, wherein a retaining recess of a first one of the two tubes forms a first limb of the "V" and a retaining recess of a second one of the two tubes forms a second limb of the "V".

14. The binocular according to claim 1, wherein a cross-section normal to the first plane and to the direction of the optical axis through each one of the tubes in the region of their waists has its widest part in an intersection area of the tube with the first plane.

15. The binocular according to claim 14, wherein the tip of the roof section of the prism erecting system is arranged in the region of the widest part, wherein the shortest distance between the tip of the roof section and the inner wall of the tube is smaller than the shortest distance between the tip of the roof section and a surface of the prism erecting system opposite the tip of the roof section.

16. The binocular according to claim 1, wherein a third plane extending through the first retaining recess at the upper side of the tube and through the second retaining recess at the bottom side of the tube extends through the prism erecting system.

* * * * *